(12) United States Patent
Luukkala et al.

(10) Patent No.: US 9,166,953 B2
(45) Date of Patent: Oct. 20, 2015

(54) METHOD AND APPARATUS FOR PROVIDING IDENTITY BASED ENCRYPTION IN DISTRIBUTED COMPUTATIONS

(75) Inventors: Vesa-Veikko Luukkala, Espoo (FI); Sampo Juhani Sovio, Riihimäki (FI); Jari-Jukka Harald Kaaja, Järvenpää (FI); Sergey Boldyrev, Söderkulla (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/285,254

(22) Filed: Oct. 31, 2011

(65) Prior Publication Data

US 2013/0108040 A1  May 2, 2013

(51) Int. Cl.
| | |
|---|---|
| H04L 9/00 | (2006.01) |
| H04L 29/06 | (2006.01) |
| H04L 9/08 | (2006.01) |
| H04L 9/30 | (2006.01) |
| G06F 21/60 | (2013.01) |
| G06F 21/62 | (2013.01) |
| H04L 29/08 | (2006.01) |

(52) U.S. Cl.
CPC ............. *H04L 63/04* (2013.01); *G06F 21/602* (2013.01); *H04L 9/0847* (2013.01); *H04L 9/3073* (2013.01); *G06F 21/6254* (2013.01); *G06F 2221/2107* (2013.01); *G06F 2221/2109* (2013.01); *G06F 2221/2113* (2013.01); *G06F 2221/2117* (2013.01); *G06F 2221/2149* (2013.01); *H04L 63/0421* (2013.01); *H04L 67/1097* (2013.01); *H04L 2209/42* (2013.01)

(58) Field of Classification Search
CPC .............. H04L 9/3037; H04L 63/0421; H04L 2209/42; G06F 21/6254
USPC .......................................................... 380/30
See application file for complete search history.

(56) References Cited

U.S. PATENT DOCUMENTS

| | | | | |
|---|---|---|---|---|
| 7,703,140 | B2 * | 4/2010 | Nath et al. ...................... | 726/26 |
| 8,108,678 | B1 * | 1/2012 | Boyen ............................ | 713/176 |
| 8,127,366 | B2 * | 2/2012 | Vainstein et al. ............... | 726/27 |
| 2001/0018736 | A1 * | 8/2001 | Hashimoto et al. ............. | 713/1 |

(Continued)

FOREIGN PATENT DOCUMENTS

| | | |
|---|---|---|
| CN | 102064946 A | 5/2011 |
| WO | WO 99/44364 A1 | 9/1999 |

OTHER PUBLICATIONS

Notification of Transmittal of the International Search Report and the Written Opinion of the International Searching Authority, or the Declaration for International Application No. PCT/FI2012/051036, dated Feb. 13, 2013, pp. 1-12.

(Continued)

*Primary Examiner* — Techane Gergiso
(74) *Attorney, Agent, or Firm* — Alston & Bird LLP

(57) ABSTRACT

An approach is provided for providing identity based encryption in distributed computations. An identity based encryption platform causes, at least in part, a segmentation of a computation closure into at least a first part and one or more second parts. The identity based encryption platform also causes, at least in part, an encryption of the one or more second parts using the first part as a public key of an identity-based encryption.

18 Claims, 15 Drawing Sheets

(56) References Cited

U.S. PATENT DOCUMENTS

| | | | |
|---|---|---|---|
| 2005/0071632 A1* | 3/2005 | Pauker et al. | 713/165 |
| 2005/0102507 A1* | 5/2005 | Sozzani et al. | 713/165 |
| 2005/0102512 A1* | 5/2005 | Goh et al. | 713/168 |
| 2005/0102523 A1* | 5/2005 | Harrison et al. | 713/185 |
| 2005/0125670 A1* | 6/2005 | Sozzani et al. | 713/171 |
| 2005/0138353 A1* | 6/2005 | Spies et al. | 713/153 |
| 2005/0246533 A1* | 11/2005 | Gentry | 713/170 |
| 2006/0023887 A1 | 2/2006 | Agrawal et al. | |
| 2006/0123238 A1* | 6/2006 | Kacker et al. | 713/185 |
| 2008/0044032 A1* | 2/2008 | Lou et al. | 380/284 |
| 2008/0170701 A1* | 7/2008 | Matsuo et al. | 380/281 |
| 2009/0307497 A1* | 12/2009 | Appenzeller et al. | 713/171 |
| 2009/0327731 A1* | 12/2009 | Appenzeller et al. | 713/171 |
| 2010/0017593 A1* | 1/2010 | Putz | 713/150 |
| 2010/0098253 A1* | 4/2010 | Delerablee | 380/259 |
| 2010/0211781 A1 | 8/2010 | Auradkar et al. | |
| 2010/0299313 A1 | 11/2010 | Orsini et al. | |
| 2011/0016321 A1* | 1/2011 | Sundaram et al. | 713/171 |
| 2011/0055567 A1* | 3/2011 | Sundaram et al. | 713/169 |
| 2011/0102546 A1* | 5/2011 | Dhuse et al. | 348/46 |
| 2011/0145593 A1* | 6/2011 | Auradkar et al. | 713/189 |
| 2011/0187511 A1 | 8/2011 | Boldyrev et al. | |
| 2011/0238985 A1* | 9/2011 | Sovio et al. | 713/168 |
| 2011/0258430 A1* | 10/2011 | Luukkala et al. | 713/150 |
| 2011/0320516 A1 | 12/2011 | Boldyrev et al. | |
| 2012/0005050 A1 | 1/2012 | Boldyrev et al. | |
| 2012/0023571 A1* | 1/2012 | Spies et al. | 726/12 |
| 2012/0288092 A1* | 11/2012 | Cakulev et al. | 380/255 |
| 2013/0110920 A1* | 5/2013 | Broustis et al. | 709/204 |

OTHER PUBLICATIONS

A. Kate et al., "Anonymity and security in delay tolerant networks," Third International Conference on Security and Privacy in Communications Networks and the Workshops, Sep. 17, 2007, pp. 504-513.

Extended European Search Report from European Patent Application No. 12846674.5 dated Aug. 25, 2015.

Stading, T., *Secure Communication in a Distributed System Using Identity Based Encryption*, Proceedings of the 3rd IEEE/ACM International Symposium on Cluster Computing and the Grid, (May 2003) 1-7.

* cited by examiner

METHOD AND APPARATUS FOR PROVIDING IDENTITY BASED ENCRYPTION IN DISTRIBUTED COMPUTATIONS

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This can be achieved through numerous, individual and personal information spaces in which persons, groups of persons, etc. can place, share, interact and manipulate (or program devices to automatically perform the planning, interaction and manipulation of) webs of information with their own locally agreed semantics without necessarily conforming to an unobtainable, global whole.

Furthermore, in addition to information, the information spaces may be combined with webs of shared and interactive computations or computation spaces so that the devices having connectivity to the computation spaces can have the information in the information space manipulated within the computation space environment and the results delivered to the device, rather than the whole process being performed locally in the device. It is noted that such computation spaces may consist of connectivity between devices, from devices to network infrastructure, to distributed information spaces so that computations can be executed where enough computational elements are available. These combined information spaces and computation spaces often referred to as computation clouds, are extensions of the 'Giant Global Graph' in which one can apply semantics and reasoning at a local level.

In one example, clouds are working spaces respectively embedded with distributed information and computation infrastructures spanned around computers, information appliances, processing devices and sensors that allow people to work efficiently through access to information and computations from computers or other devices. An information space or a computation space can be rendered by the computation devices physically presented as heterogeneous networks (wired and wireless). On the other hand, different levels of proactive computational elements may be available to the device in various other components of various architectural levels (e.g. device level, infrastructure level, etc.), wherein different distributed components may have different capabilities and support different processes. In various example circumstances, to enhance the information processing power of a device and reduce the processing cost, one might consider minimizing or at least significantly improving exchange of data, information and computations among the distributed components within a computational architecture by providing multi-level distributed computations, such that the data can be migrated to the closest possible computation level with minimized or improved cost.

However, despite the fact that information and computation presented by the respective levels of computation architecture can be distributed with different granularity, still there are challenges in certain example implementations to achieve scalable high context information processing within such heterogeneous environments. For example, in various implementations, due to distributed nature of the architecture, (e.g., devices, infrastructures, and clouds), data, information, and computation elements (e.g., computation closures) are being exchanged among distributed devices within heterogeneous network environments wherein information with various levels of granularity and various structures is provided by and transmitted among various independent sources. However, there is no identity-based encryption of the computation closures such that allows a component to place a restriction on computation closures of other components within the distributed environment. Furthermore, there are no anonymization mechanisms for protecting the privacy of the computation closure owners.

SOME EXAMPLE EMBODIMENTS

Therefore, there is a need for an approach for providing identity based encryption in distributed computations.

According to one embodiment, a method comprises causing, at least in part, a segmentation of a computation closure into at least a first part and one or more second parts. The method also comprises causing, at least in part, an encryption of the one or more second parts using the first part as a public key of an identity-based encryption.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a segmentation of a computation closure into at least a first part and one or more second parts. The apparatus is also caused to cause, at least in part, an encryption of the one or more second parts using the first part as a public key of an identity-based encryption.

According to another embodiment, a computer-readable storage medium carries one or more sequences of one or more instructions which, when executed by one or more processors, cause, at least in part, an apparatus to cause, at least in part, a segmentation of a computation closure into at least a first part and one or more second parts. The apparatus is also caused to cause, at least in part, an encryption of the one or more second parts using the first part as a public key of an identity-based encryption.

According to another embodiment, an apparatus comprises means for causing, at least in part, a segmentation of a computation closure into at least a first part and one or more second parts. The apparatus also comprises means for causing, at least in part, an encryption of the one or more second parts using the first part as a public key of an identity-based encryption.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing identity based encryption in distributed computations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, selecting results provided from computation of alternative inputs, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

Figure 1:
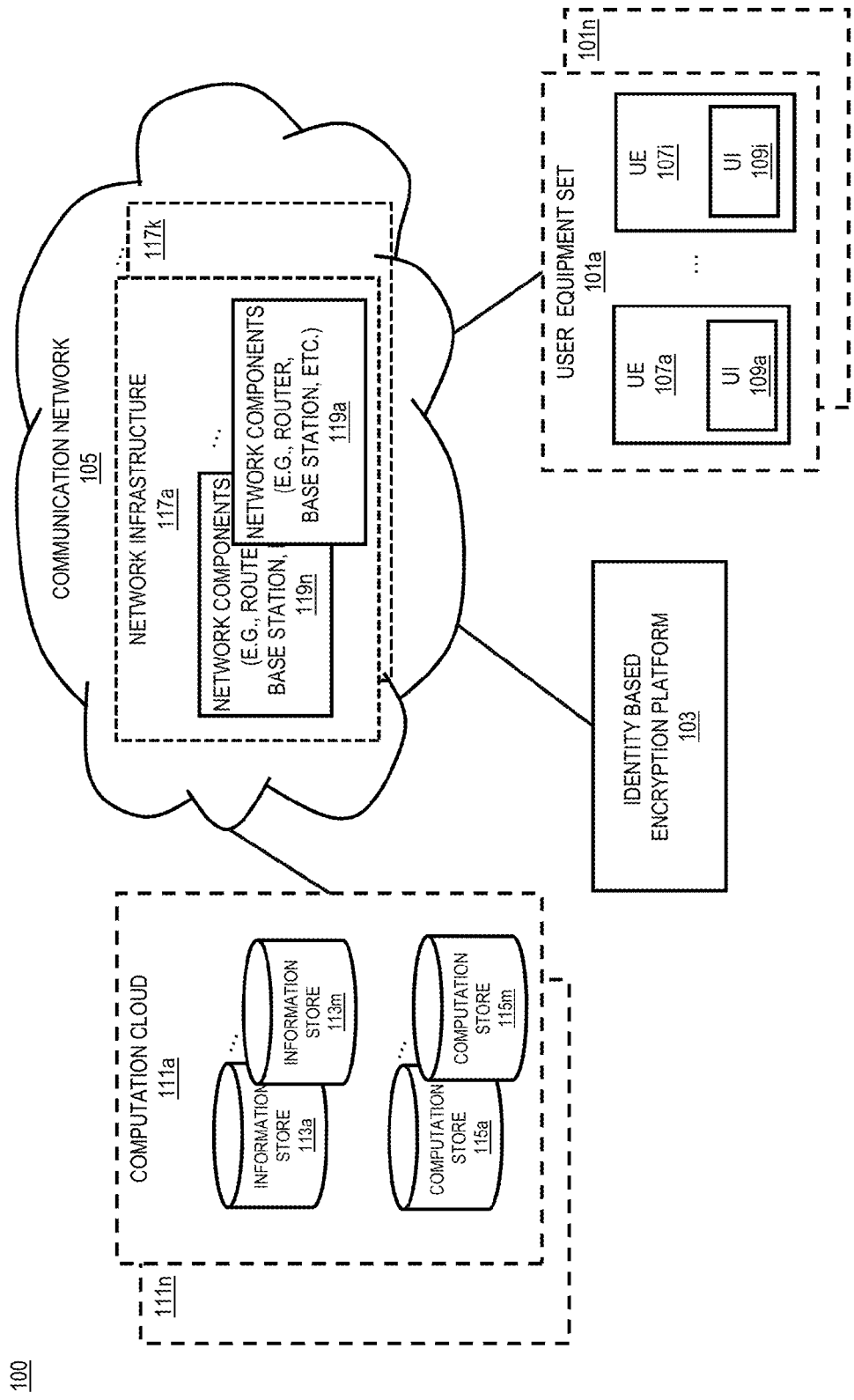
FIG. 1 is a diagram of a system capable of providing identity based encryption in distributed computations, according to one embodiment.

FIG. 1 is a diagram of a system capable of providing identity based encryption in distributed computations, according to one embodiment. As previously described, a cloud environment consists of information and computation resources each consisting of several distributed devices that communicate information and computation closures (e.g. RDF graphs) via a shared memory. A device within a cloud environment may store computation closures locally in its own memory space or publish computation closures on a globally accessible environment within the cloud. In the first case, the device is responsible for any process needed for combination or extraction of computations, while in the second case the processes can be conducted by the globally accessible environment which includes the device. The device can utilize the resources of the architectural infrastructure level, for example for energy saving, without having to access the cloud level, if energy cost is lower at infrastructure level. Alternatively, a device may have direct computation closure connectors to cloud level or to other peer devices, where devices are more tightly linked to cloud environment for energy saving purposes, or when other environments are not needed or available.

The basic concept of cloud computing technology provides access to distributed computations for various devices within the scope of the cloud, in such a way that the distributed nature of the computations is hidden from users and it appears to a user as if all the computations are performed on the same device. The cloud computing also enables a user to have control over computation distribution by transferring computations between devices that the user has access to. For example, a user may want to transfer computations among work devices, home devices, and portable devices, other private and public devices, etc. Current technologies enable a user of a mobile device to manipulate contexts such as data and information via the elements of a user interface of their user equipment. However, distribution of computations and processes related to or acting on the data and information within the cloud is typically controlled by the system. In other words, a cloud in general does not provide a user (e.g., an owner of a collection of information distributed over the information space) with the ability to control distribution of related computations and processes of, for instance, applications acting on the information. For example, a contact management application that processes contact information distributed within one or more clouds generally executes on a single device (e.g., with all processes and computations of the application also executing on the same device) to operate on the distributed information. In some cases (e.g., when computations are complex, the data set is large, etc.), providing a means to also distribute the related computations in addition to the information is advantageous.

This goal is achieved by introduction of the capability to construct, distribute, and aggregate computations as well as their related data. More specifically, to enable a user of a cloud (e.g., a mobile device user, an application developer, etc.) who connects to the cloud via one or more devices, to distribute computations among the one or more user devices or other devices with access to the cloud, each computation is deconstructed to its basic or primitive processes or computation closures. Once a computation is divided into its primitive computation closures, the processes within or represented by each closure may be executed in a distributed fashion and the processing results can be collected and aggregated into the result of the execution of the initial overall computation.

In one embodiment, a computational architecture consists of a plurality of architectural levels, including a device level, and infrastructure level, and a cloud computing level. A device from the device level has connectivity to the cloud computing level via one or more infrastructure levels, wherein each infrastructure level may consist of layers and components such as backbones, routers, base stations, etc. Typically, the computation closures associated with a process related to a device from device level are defined, constructed, and executed within the cloud computing level which may have various levels of distribution as well. However, the components of the infrastructure levels may be equipped with various resources (e.g., processing environments, storage spaces, access control, etc.) that can be utilized for the execution of computation closures associated with a process. Since the infrastructure level functions as an interface between the device level and the cloud computing level, if the computation closures can be executed in the infrastructure level, there will be no need for the computation closures to be migrated to the cloud computing level that may very well require excessive use of resources. Furthermore, if such activities can be executed in the devices level, other migrations can be considered as optional, to be used for protection at the time of any failures that may occur in device to device computation closure activities. Therefore, execution of computation closures associated with a process related to a device at the infrastructure level can provide services to device users in a more efficient manner. However, components of a multi-level architectural environment composed of device level, infrastructure level and cloud level each may differ in configuration, communication capability, policies applied in terms of ownership, privacy and security of distributed computations, etc.

It is noted that, as part of the context sharing process, it is important to have control on context migration as the execution context (e.g. computation closures) can be communicated across potential insecure channels within one or more components or levels of the computation architecture. Also, the consistency of the execution context, as communicated across potentially insecure channels, is important. Moreover, parts of the execution context may not be safe to be published without at least some form of encryption. Public key cryptography is a widely used encryption/decryption method to protect data. However, use of long and randomly generated encryption keys and management and storage of encryption/decryption keys, encryption/decryption criteria, certificate, etc., are becoming daunting as the number of users, computing platforms, etc., and complexity of computation architecture structure in general is increasing. Further, the particular problem in publishing the execution context is how to publish the context with one or more criteria so that only intended recipients meeting execution context criteria can decrypt or otherwise access the shared execution context among one or more computational environments.

Therefore, there is a challenge to achieve computation security, anonymization and privacy within a heterogeneous environment of distributed architectures, wherein computations with various levels of granularity and various structures are provided and transmitted among various independent sources.

To address this problem, a system 100 of FIG. 1 introduces the capability to provide identity based encryption in distributed computations.

It is noted that, various computation architectures are equipped with encryption mechanisms such as, for example, Identity Based Encryption (IBE), anonymization, privacy policies and rules, etc. The Identity Based Encryption (IBE) is a type of public-key encryption in which the public key of a user is some unique information about the identity of the user (e.g., user's email address). This encryption mechanism can, for example, use the value of the name or domain name as a key. Anonymization of computation closures enables masking of the identity.

Typically, in a multi-level computation architecture, one level of architecture does not have the authority to encrypt or decrypt computation closures across all levels of the architecture unless proper policies are defined. In one embodiment, IBE anonymization policies of one component or level of the computation architecture may be combined with the anonymization policies of other components and levels, creating new broader policies that cover all the components and levels involved.

In one embodiment, one or more IBE anonymization policies can be selected as primary capabilities of computation closures such as, for example, energy consumption, security enforcement, privacy policies/rules, IBE anonymization policies/rules, connection quality, etc. In this case, other capabilities may be combined and operated with the primary capabilities, providing various results to be used in setting up the computational parameters such as, for example, capabilities, functional flow map, cost functions, rules, etc. For example, a primary capability parameter may allow selection of secondary capabilities.

In one embodiment, device-infrastructure as well as infrastructure-cloud and device-cloud architectures have computation closure based structures and functional flows, which are balanced among the available components, include energy rules determining energy requirements, and utilize end to end secure computation closures.

In one embodiment, IBE encryption, decryption, execution and validation within a distributed environment (e.g., a multi-level environment) consist of IBE anonymization, IBE encryption and decryption anonymization execution domain at every component or level of the architecture, wherein each domain may provide its own IBE mechanism.

In one embodiment, IBE encryption policies for signed functional flows of computation closures may have overlapping capabilities which may affect overall execution results. For example, one or more components (e.g. devices) may have power limitations and this may affect the IBE encryption policy rules, and information sharing schemes used.

In one embodiment, IBE encryption-decryption anonymization policy provides different degrees of what and how policy enforcement is performed. The computation closure IBE encryption-decryption anonymization policy consists of mechanisms such as encryption, decryption, filtering, privacy enforcement, etc.

In one embodiment, computation closures are used based on IBE encryption policy enforcement and, for example, mechanisms for closure signing. The identity based encryption provided, creates balance between security, privacy and energy limitation settings and threshold for every component or level of a distributed computation environment.

In one embodiment, different components may support different computation closures. Each component (e.g. infrastructure element) may have a number of pre-created entities, computation closures and hooks for the computation (e.g., connectors between closures, multiple branches, interaction points, rules, etc.).

In one embodiment, the identity based encryption platform 103 of FIG. 1 enables any of the components of the computation architecture to require the presence of pre-created elements (e.g. rules, policies, etc.) on any other component of the architecture such that the continuation of execution of one or more computation closures can be unlocked (decrypted) only by components with present pre-created elements.

As shown in FIG. 1, the system 100 comprises a set 101 user equipments (UEs) 107a-107i having connectivity to the identity based encryption platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, close proximity technologies such as Near Field Communication (NFC) and the like, or any combination thereof. Furthermore, the wireless network may be equipped with separate channels for wireless power transfer for the peer computation closure device platform and separate channels for close proximity data transfer.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 107a-107i can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). These contexts may require certain sets of media dependent computation closures, which may affect the service, for example the bit error rate, etc. Additionally, each UI element may be bound to a context/process by granular distribution. In one embodiment, granular distribution enables processes to be implicitly or explicitly migrated between devices, computation clouds, and other infrastructure. Additionally, a UE 107a-107i may be a mobile device with embedded Radio Frequency (RF) tag system of device to device connections such that computational operations and content can be locally transmitted among devices.

In one embodiment, process distribution can be initiated for example by means of unicast (e.g., to just another device) or multicast (e.g., to multiple other devices). For example one UE 107 may communicate with many infrastructures (or many components of many infrastructures), while many nodes of infrastructures may communicate with multiple clouds. Additionally, process distribution may be triggered via gesture recognition, wherein the user preselects a particular set of UI elements and makes a gesture to simulate "pouring" the selected UE elements from one device to another. In other embodiments, process distribution may be initiated automatically without direct user involvement and based on default setup by the manufacturer of the UE 107a-107i, previous setup by the user of the UE, default setup in an application activated on or associated with a UE 107a-107i, or a combination thereof. Furthermore, process distribution may be triggered by wireless power transfer systems such as, for example, close proximity environments, where applicable. The wireless power transfer may be used only for process triggering, or remain in use during the rest of the process period.

As seen in FIG. 1, a user of UEs 107a-107i may own, use, or otherwise have access to various pieces of information and computations distributed over one or more computation clouds 111a-111n in information stores 113a-113m and computation stores 115a-115m where each of the one or more computation spaces 115a-115m include multiple sets of one or more computation closures. In one embodiment, the user may be an application developer that uses a UE 107a-107i to connect to the infrastructure and the cloud not only for accessing the services provided for end users but also for activities such as developing, distributing, processing, and aggregating various computations.

In one embodiment, the communication network 105 consists of one or more infrastructures 117a-117k wherein each infrastructure is a designed communication system including multiple components 119a-119n. The components 119a-119n include backbones, routers, switches, wireless access points, access methods, protocols, etc. used for communication within the communication network 105 or between communication network 105 and other networks.

In one embodiment, the identity based encryption platform 103 controls the distribution of computations associated with UEs 107a-107i to other components or levels of the computational architecture including the infrastructure level 117a-117k within the environment of the communication network 105, and the cloud level 111a-111n, based on privacy policies, anonymization policies, rules, security enforcements, etc. associated with different architectural components and/or levels and security/privacy requirements of computations.

In one embodiment, security verification of computation distribution may be initiated by the user, or based on a background activity for example by triggering a sequence of computation closures which in turn support distribution process. Prior to computation distribution the capabilities, including the security, privacy, anonymization, etc. capabilities of components performing the computations, are evaluated. If capabilities of an architectural level are not satisfactory or changes in capabilities are found, the evaluation process will continue until proper capabilities become available. The capabilities may be found in the same or other levels of the computational architecture and the computation closure execution will be performed at the level where available capabilities are found.

In another embodiment, network components 119a-119n may provide different levels of functionality. For example, some components 119a-119n may provide static computation closures while others may provide dynamic computation closures. As used herein, static computation closures are closures with predetermined configurations, which in return may require a predefined level of capabilities for execution, while dynamic computation closures are closures that may function differently based on dynamic factors such as time, traffic load, energy level, type or amount of available capabilities, etc. In one embodiment, a dynamic computation closure may adjust itself based on the dynamic factors by modifying parameters such as the level of available privacy. For example, a dynamic computation closure may downgrade itself in order to be handled with a lower level of privacy. In other embodiments, critical computation closures may be assigned lower and upper acceptable privacy or security thresholds wherein available privacy/security within that range is acceptable.

In one embodiment the level and type of available capabilities at a component of the infrastructure 117a-117k may or may not be aligned with the required capabilities by computation closures of UE 107a-107i through a one to one mapping. This means that the component may need to locate (or request) other components with higher levels of capabilities from current or next layer or level of the computational architecture and forward the computations to located components. The component may also have the capability to adjust its capability settings and adapt it to the computation requirements. In other words, if the capabilities availability between a process and its processing environment is not directly aligned, the processing environment may expand its capabilities (for dynamic closures) or locate other components (for static closures) or a combination thereof. In one embodiment, if neither the direct alignment succeeds nor alternate environment is found, the setup may be aligned with lower capability requirements. The requirements may be lowered, for example by dropping part of the computation closures, substituting complex computations with more primitive computations that may produce less accurate, but accurate enough for user's needs, results. Additionally, the satisfaction threshold may be lowered (with service provider and user's agreement) so that a lower level of computation capability can be considered as satisfactory.

In one embodiment, the identity based encryption platform 103 may hide the information showing the ownership of computation closure and functional flows. The identity based encryption platform 103 may also decompose anonymization policies associated with users, devices, contents, computation closures, etc. that are applied to certain functional flows (e.g., processes, executions, contents, etc.). Additionally, the identity based encryption platform 103 may enforce methods of selected and verified identity based encryption, anonymization and decryption on the computation closures.

In one embodiment, the identity based encryption platform 103 utilizes IBE encryption mechanisms, to protects the anonymity of the encryptor or computation owner, who may target a large audience (e.g. a group by social or other criteria) that may be identified only by the capability of executing a computation closure or an aggregated closure consisting of a composition of primitive closures and connectors.

In one embodiment, the identity based encryption platform 103 checks that a component has the necessary facilities, in a broad sense, to continue the execution of a whole closure chain or functional flow, wherein the facilities may include suitable primitive closures, suitable ordering of the primitive closures, suitable state, etc.

In one embodiment, the identity based encryption platform 103 provides a policy mechanism including encryption and anonymization methods for computation closures that have been built from primitive closures or from chains of closures. The IBE encryption mechanism, which protects anonymity of the encryptor, who may target a large audience while only identified by the capability of executing one or more computation closures In one embodiment, an encryptor may aim at execution of a complete chain of computation closures. In order to ensure the execution, the encryption may use part of the computation closure chain for encryption of the rest of the chain using IBE mechanism and publish the encrypted part. In this embodiment, other components will be able to decrypt the content only if they can present the same first part of the chain as the encryptor has originally used. The Identity based computation closures or closure chains can be selected from various attributes, components or levels of the computation architecture such as for example users, devices, time, space, infrastructures, clouds, etc. The encryptor may encrypt different content as desired and control what kind of computation closures can be executed.

In one embodiment, the identity based encryption mechanism may be bidirectional, meaning that a device may set its own criteria for an infrastructure or for a cloud and an infrastructure may set its own criteria for devices and clouds, to provide IBE based encryption-decryption anonymization policy.

In one embodiment, the identity based encryption platform 103 uses a private key generator (PKG) which is used to obtain the decryption keys corresponding to the criteria which may also reside in any part of the computation architecture (e.g., device, infrastructure, cloud). However, a PKG can only reside inside trustworthy devices, infrastructures, or services which ensure integrity, since only the PKG can be used to generate a private key for decryption. It is noted that the trustworthiness of a device can be verified using device certification.

In one embodiment, the IBE anonymization can be applied in various domains of any level of the computation architecture at device, infrastructure, or cloud level, where each domain may provide its own IBE mechanism. Additionally, each computation closure, branch or functional flow may enable and utilize different IBE mechanisms and rulings, if needed.

By way of example, the UEs 107a-107i, and the identity based encryption platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
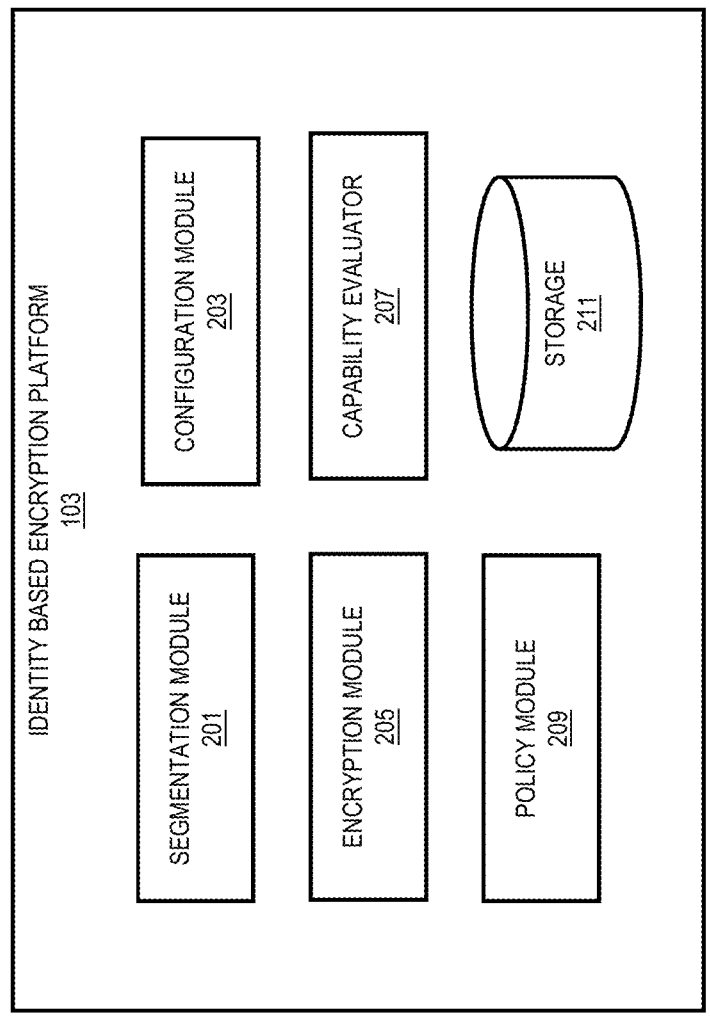
FIG. 2 is a diagram of the components of an identity based encryption platform, according to one embodiment.

FIG. 2 is a diagram of the components of an identity based encryption platform, according to one embodiment. By way of example, the identity based encryption platform includes one or more components for providing identity based encryption in distributed computations. It is contemplated that the functions of these components may be combined in one or more components or performed by other components of equivalent functionality. In this embodiment, the identity based encryption platform includes a segmentation module 201, a configuration module 203, an encryption module 205, a capability evaluator 207, a policy module 209, and a storage 211.

Figure 3:
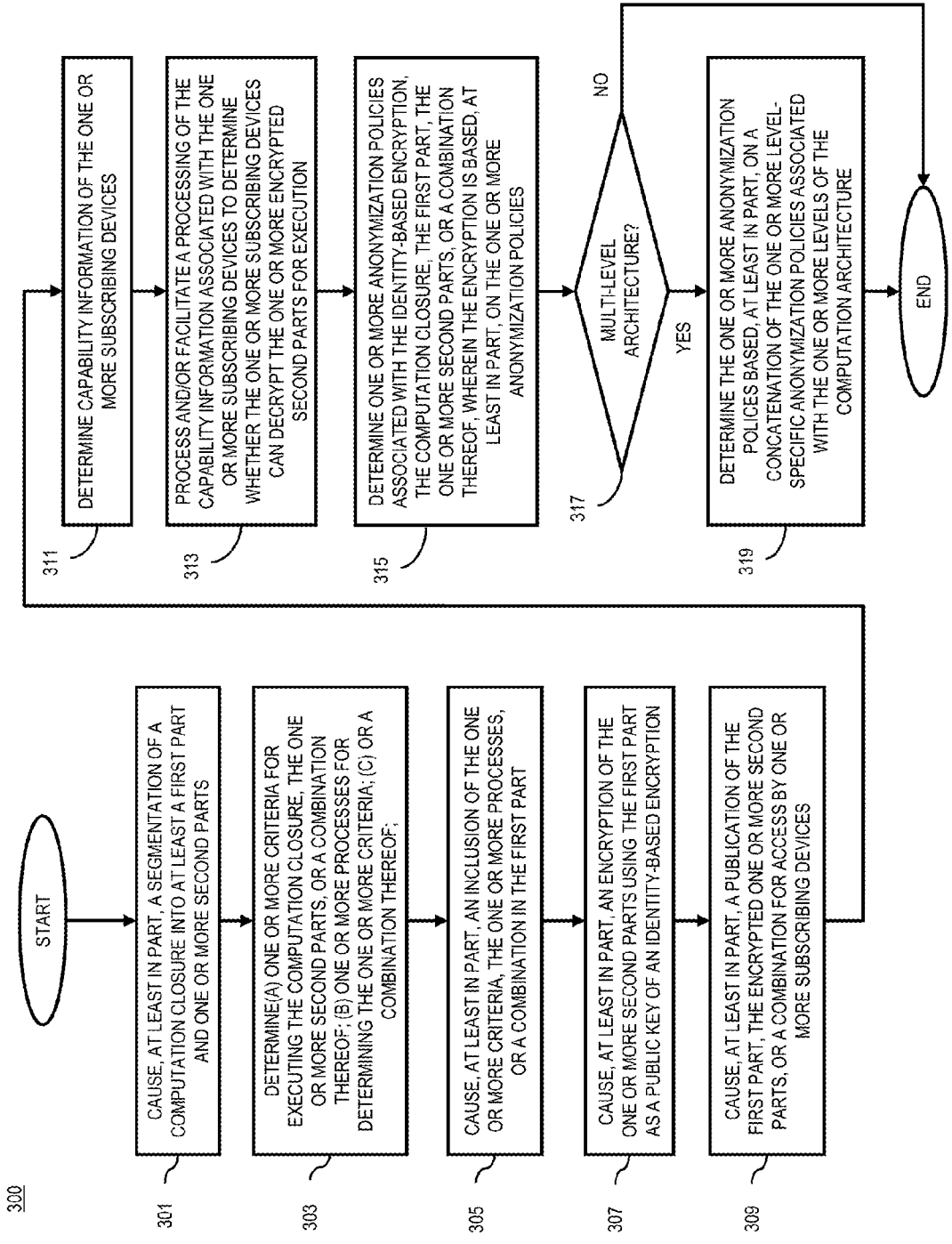
FIG. 3 is a flowchart of a process for providing identity based encryption in distributed computations, according to one embodiment.
Figure 4:
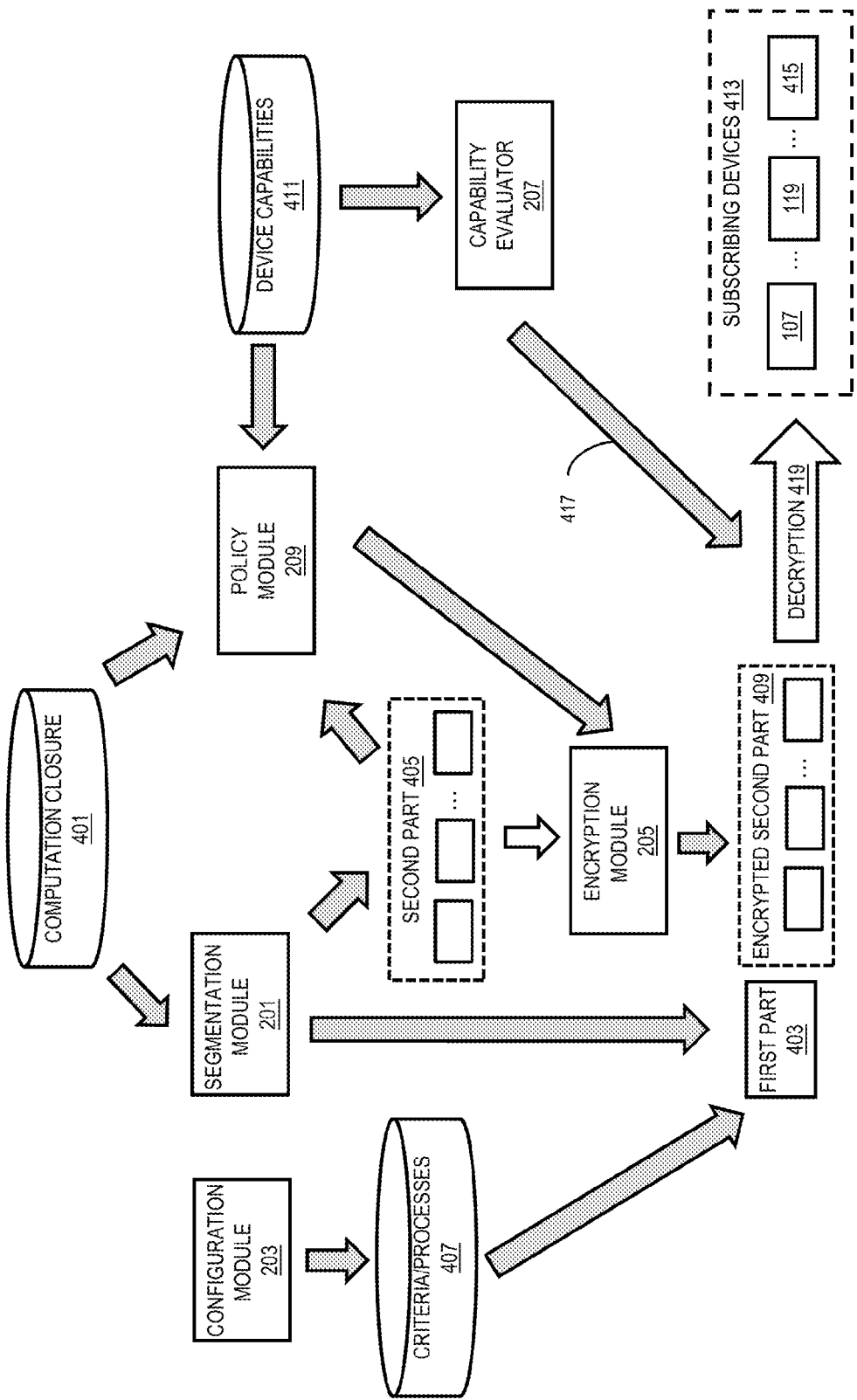
FIG. 4 is a flowchart of the process of FIG. 3 for providing identity based encryption in distributed computations, according to one embodiment.
Figure 12:
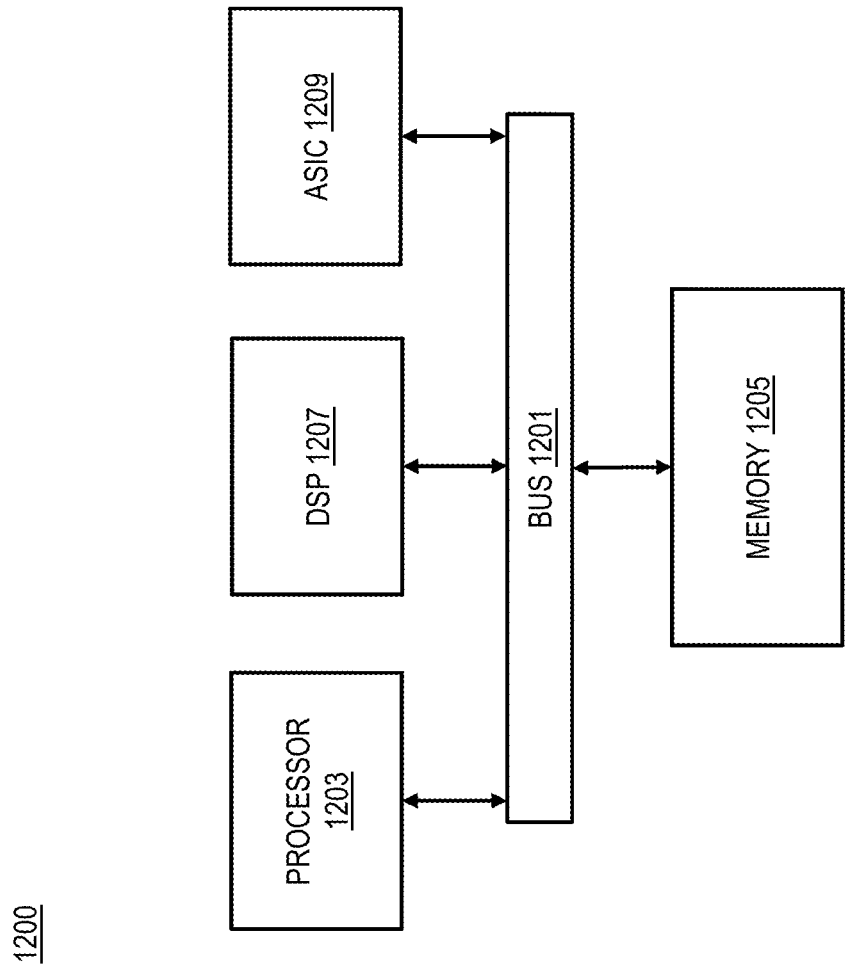
FIG. 12 is a diagram of a chip set that can be used to implement an embodiment of the invention.

FIG. 2 is described with respect to FIGS. 3 AND 4, wherein FIG. 3 is a flowchart of a process for providing identity based encryption in distributed computations, according to one embodiment and FIG. 4 is a flow diagram of a process for providing identity based encryption in distributed computation, according to one embodiment. In one embodiment, the identity based encryption platform 103 performs the process 300 and is implemented in, for instance, a chip set including a processor and a memory as shown in FIG. 12.

In one embodiment, per step 301 of flowchart 300 of FIG. 3, the segmentation module 201 causes, at least in part, a segmentation of a computation closure 401 (shown in FIG. 4) associated with a process of a UE 107a-107i, a network component 111a-119n, a computation cloud 111a-111n or a combination thereof, into at least a first part 403 and one or more second parts 405, wherein the computation closure 401 comprises concatenation of the first part and the second part.

In one embodiment the segmentation module 201 may cause the segmentation of closure 401 based, at least in part, on one or more cost functions, one or more functional flow maps, or a combination thereof associated with the computation closure 401.

In one embodiment, per step 303 of FIG. 3, the configuration module 203 determines one or more criteria for executing the computation closure 401, the one or more second parts 405, or a combination thereof. The configuration module 203 also determines one or more processes for determining the one or more criteria, or a combination thereof.

In one embodiment, per step 305 of FIG. 3, the configuration module 203 causes, at least in part, an inclusion of the one or more criteria, the one or more processes, or a combination 407 in the first part 403.

In one embodiment, per step 307 of FIG. 3, the encryption module 205 causes, at least in part, an encryption of the one or more second parts 405 using the first part 403 as a public key of an identity-based encryption. In one embodiment the encryption module 205 may cause the encryption of the second part 405 based, at least in part, on one or more cost functions, one or more functional flow maps, or a combination thereof associated with the computation closure 401. Furthermore, the encryption may be further based, at least in part, on one or more private keys.

In one embodiment, per step 309 of FIG. 3, the configuration module 203 causes, at least in part, a publication of the first part 403, the encrypted one or more second parts 409, or a combination for access by one or more subscribing devices 413, wherein a subscriber device may be a UE 107a-107i, an infrastructure component 119a-119n, a component 415 of the computation cloud 111a-111n, or a combination thereof.

In one embodiment, per step 311 of FIG. 3, the capability evaluator 207 determines capability information 411 of the one or more subscribing devices 413. The capability information 411 may be obtained directly from the subscribing device 413, from the storage 211, from clouds 111a-111n, or a combination thereof.

In one embodiment, the capability evaluator 207, per step 313 of FIG. 3, processes and/or facilitating a processing of the capability information 411 associated with the one or more subscribing devices 413 to determine whether the one or more subscribing devices can decrypt the one or more encrypted second parts 409 for execution. If one or more subscriber devices 413 are allowed to decrypt the encrypted second parts 409 per arrow 417 the capability evaluator 207 approves the access and decryption 419 of the encrypted second parts 409 by the one or more subscriber devices 413.

In one embodiment, the capability information 411 is based, at least in part, on energy consumption information, security enforcement information, one or more privacy policies, computational resource information, bandwidth availability information, or a combination thereof associated with the one or more subscribing devices 413.

In one embodiment, per step 315 of FIG. 3, the policy module 209 determines one or more anonymization policies associated with the identity-based encryption, the computation closure 401, the first part 403, the one or more second parts 405, or a combination thereof, wherein the encryption of the second part 405 by the encryption module 205 is based, at least in part, on the one or more anonymization policies determined by the policy module 209.

In one embodiment, the policy module 209 may determine the one or more anonymization policies based, at least in part, on a concatenation of the one or more level-specific anonymization policies associated with the one or more levels of the computational architecture. In this embodiment, the device capabilities 411 may include level-specific anonymization policies associated with each of the subscribing devices 107, 119, 415 from device set 413. The policy module 209 determines one or more anonymization policies by combining (e.g. concatenating) the anonymization policies for each device 107, 119, 415, etc.

In various embodiments, the computation closures 401, the criteria and processes 407, the device capabilities 411 or a combination thereof may be determined from the storage 211, from the UEs 107a-107i, from infrastructures 117a-117k, from clouds 111a-111n, or a combination thereof. Furthermore, the first part 403, the second parts 405, the encrypted second parts 409 or a combination thereof may be stored in storage 211, in information spaces 113a-113m, in computation stores 115a-115m, in UEs 107a-107i, or a combination thereof.

In one exemplary embodiment, the identity based encryption platform 103 may have access to a complete chain of closures that is being executed. In order to ensure the execution, the encryption module 205 uses first part 403 of the closure chain 401 to IBE-encrypt the rest of the chain 405 and publishes the encrypted part 409. The identity based encryption platform 103 checks that the only entities from set 413 that can decrypt the content 409 must present the same first part 403 of the chain as the first part generated by the segmentation module 201.

In one embodiment, the encrypted second part 409 can be made available publicly at any of the subscribing devices 413, wherein the subscribing devices may be components of a multi-level device-infrastructure-cloud computation architecture. Furthermore, the encryption can be done based on factory or retail installed IBE parameters and the criteria.

In one embodiment, the encrypted closure(s) 409 can be decrypted only when another, previously unknown entity, from set 413 can present the same criteria as was used by the encryption module 205 to encrypt the content 405 and the original closure 401 can be recombined from its parts 403 and 405.

In one embodiment, the device performing decryption 419 will need to obtain the decryption key matching the criteria from a Private Key Generator (PKG). (not shown)

In one embodiment, a private Key generator (PKG) may use various methods to verify identity of the entity requesting a private key. For example, the PKG may verify the identity based on the access rights of the entity or the component containing the entity. Alternatively, the PKG may access information from the information store 113a-113m and make deductions from the information. For example, if a UE 107a-107i offers criteria stating that the user is a fan of the Beatles, the PKG may check whether the user of UE 107a-107i belongs to any Beatles fan clubs. Additionally, the PKG may make history based deductions. For example, the PKG may check whether the user of UE 107a-107i has listened to any Beatles songs. The PKG may be associated with a PKG infrastructure that provides access rights, policies, rules, configurations, etc. to the PKG. This ensures the identity based encryption platform 103 that a device 107, 119, 415, etc. has the necessary combination of primitive closures to perform the computation without other details. Any device 413 may opportunistically attempt to decrypt the encrypted second part 409. Upon a successful decryption 419, the device can construct the original closure 401 and execute it.

In one embodiment, the Private Key Generator (PKG) which is used to obtain the decryption keys corresponding to the criteria may reside in any part of the system 100 of FIG. 1. However, for any device 413 to be trustworthy (e.g. be able to decrypt the encrypted second part 409), the device should have access to the PKG for generating the private key to decrypt. Furthermore, trustworthiness of a device may be verified using device certification.

As closures 401 may include process states, in one embodiment, the same mechanism described above for decryption of computation closures may enforce a particular state of the computation at the decrypting device. Furthermore, the decryption may happen locally at the decrypting device 413, or at any other entity, device, component, or a combination thereof, especially the device that hosts the encrypted second part 409.

In one embodiment, the encryption module 205 may label the encrypted content 409 with partial criteria so that the decrypting device 413 can easily find a matching content for the criteria. For example, the encryption module 205 may label the encrypted second part 409 with the 'static' part of the closure 401, but use the state and the 'static' parts as criteria. This enables the decrypting device 413 to match its static part to look for potential decrypted second parts 409 to decrypt.

In one embodiment, when the process state is available, the encryption module 205 may use both of the state and the 'static' part of the closure to label with plain closure, but use closure and state as criteria. This means that any device 413 that has the 'static' closure part can easily find the encrypted content 409; however, it still needs the proper state to decrypt the encrypted content.

In one embodiment, instead of the first part 403, the last part of the closure 401 can be used as criteria. Furthermore, in other embodiments, the original closure 401 may be split into several parts, wherein some parts form the criteria while some other parts form the content. In this embodiment, an ordering of the parts is being determined to be used for recombining of the original closure 401 from the encrypted content 409.

In one embodiment, any device 413 may assign a policy, based on the capabilities 411 of anonymous other devices to construct the whole chain of closures. The mechanism may be bidirectional in the sense that a device may set its own criteria for other devices, the infrastructure, etc. while the infrastructure may also set its own criteria for devices.

Figure 5:
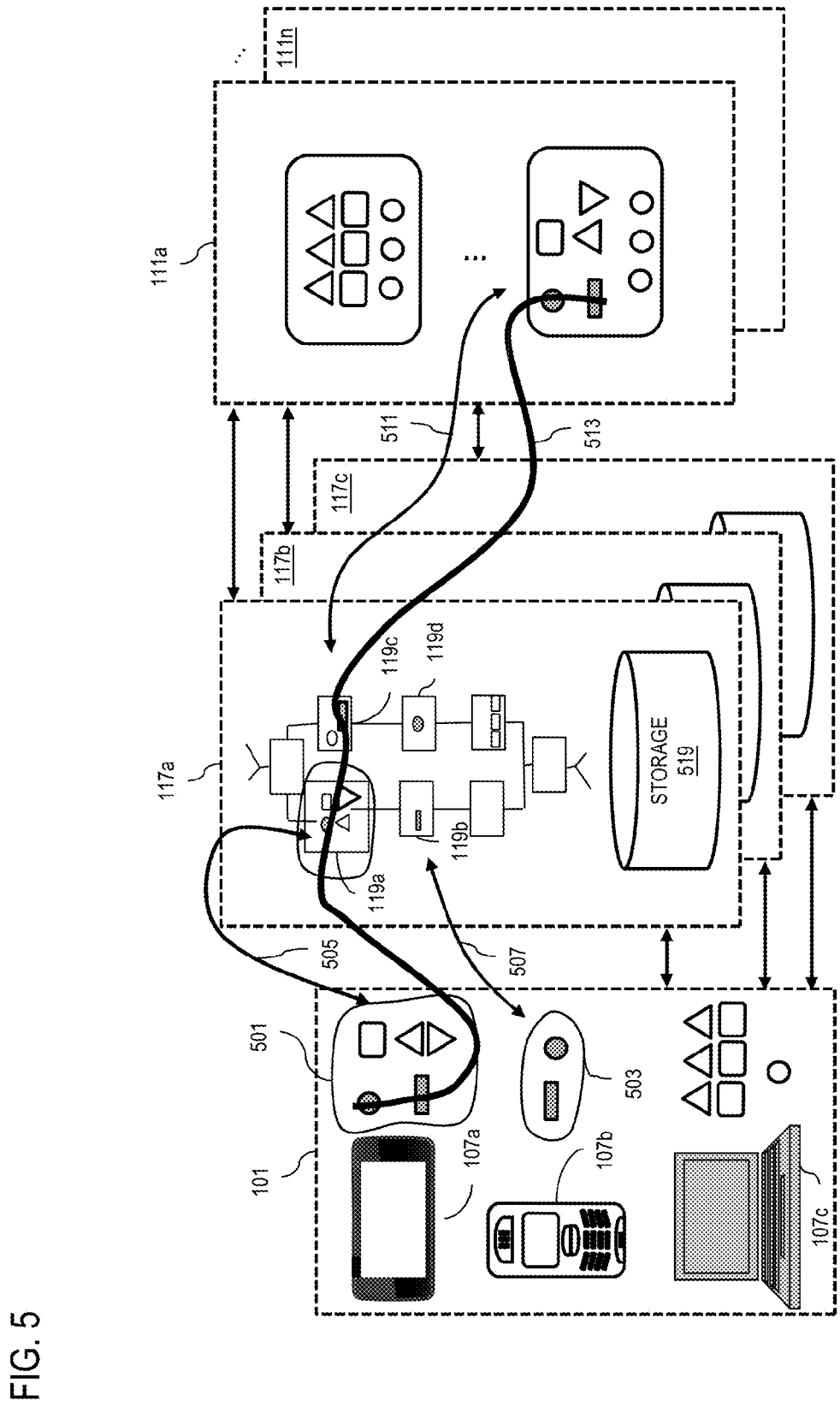
FIG. 5 is a diagram of a multi-level computational architecture with identity based encryption, according to one embodiment.

FIG. 5 is a diagram of multi-level computational architecture with IBE encryption, according to one embodiment. In one embodiment, the set 101 comprises UEs 107a, 107b, and 107c, wherein UE 107a needs set 501 and UE 107b needs set 503 of computation closures to be executed. In closure sets 501 and 503, the geometric icons represent computation closures wherein the closures that need to be encrypted (e.g. have private or sensitive content) are displayed as solidly filled icons while unencrypted closures are unfilled icons. In one embodiment, whenever the capabilities required by the encrypted closures (e.g. a certain level of battery life, a minimum required available memory, etc.) cost of evaluation of security, privacy, anonymization, or a combination thereof, for a set 501 or 503 of computation closures does not match with the device capabilities on the current level of computational architecture, the computation is distributed to the next level such as infrastructure level. The identity based encryption platform 103 receives a request from UEs 107a and 107b for encryption of sets 501 and 503 respectively. The identity based encryption platform 103 uses the information provided by devices or from other levels of infrastructures 117a-117c and clouds 111a-111n of the architecture, as described with respect to the flowchart of FIG. 3, and the flow diagram of FIG. 4, in order to encrypt computation closures 501 and 503. In the example of FIG. 5, the components 119a and 119c of the infrastructure 117a have the capabilities required by the closures 501 and the components 119b and 119d have sufficient capabilities to execute the encrypted closures of set 503. Therefore, the closures of set 501 are distributed to components 119a and 119c of the infrastructure 117a as shown by arrow 505 and the encrypted closures of set 503 are distributed to components 119b and 119d of the infrastructure 117a shown by arrow 507. Similarly, the infrastructure 117a may distribute the closures further to one or more cloud 111a-111n shown by arrow 511. The path 513 starting from set 501 in UE 107a, continuing through components 119a and 119c of the infrastructure 117a and leading to one or more cloud 111a-111n represents a functional flow for the associated closures.

Subsequent to the distribution, the receiving components can decrypt the encrypted closures and execute them, as described with regards to FIG. 4. Once the execution is completed, the results of execution of the distributed closures can be aggregated and returned to UEs 107a and 107b.

In one embodiment, the identity based encryption platform 103 may periodically receive updated information about capabilities of available components and paths, security, privacy and anonymization statuses and updated related parameters from the infrastructures and/or clouds. Additionally, the identity based encryption platform 103 may periodically request updates from the infrastructures and/or clouds about the availability status of components and paths.

Figure 6A:
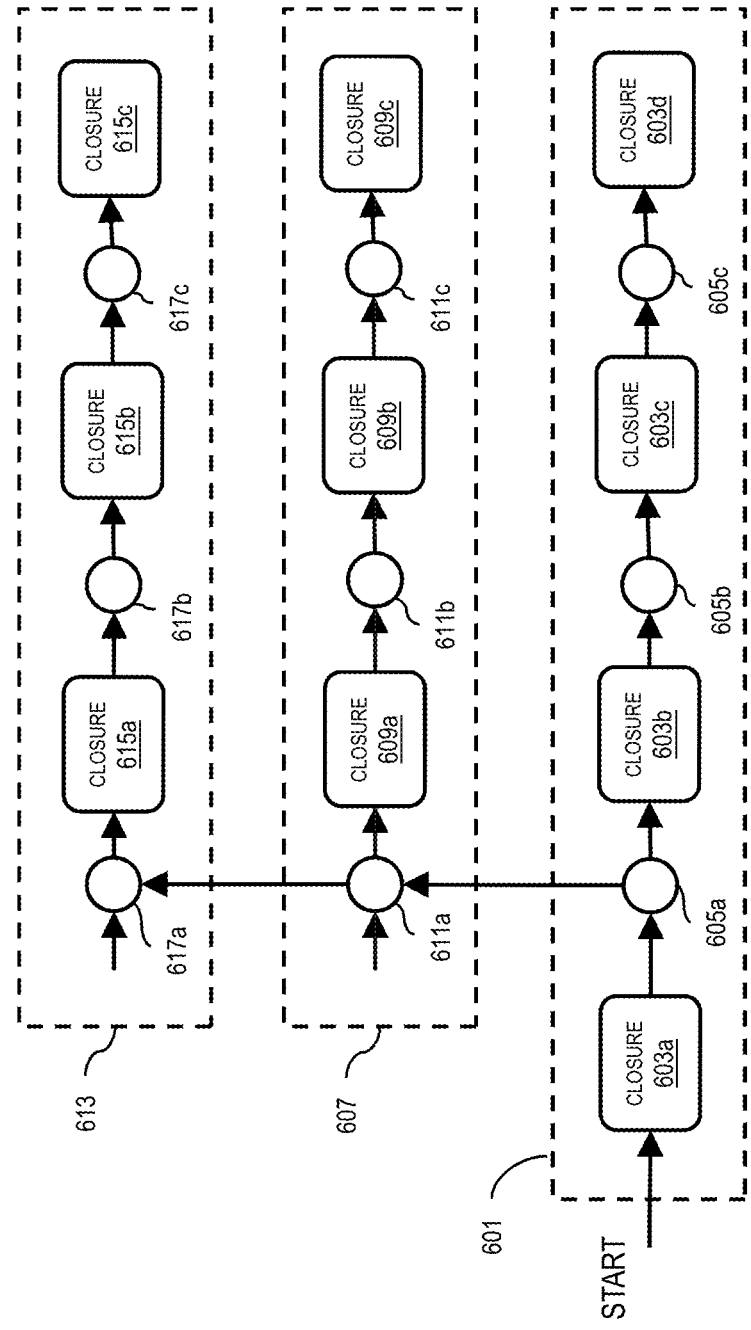
FIGS. 6A-6B are diagrams of a distribution of identity-based-encryption encrypted computations in a multi-level computational architecture, according to one embodiment.
Figure 6B:
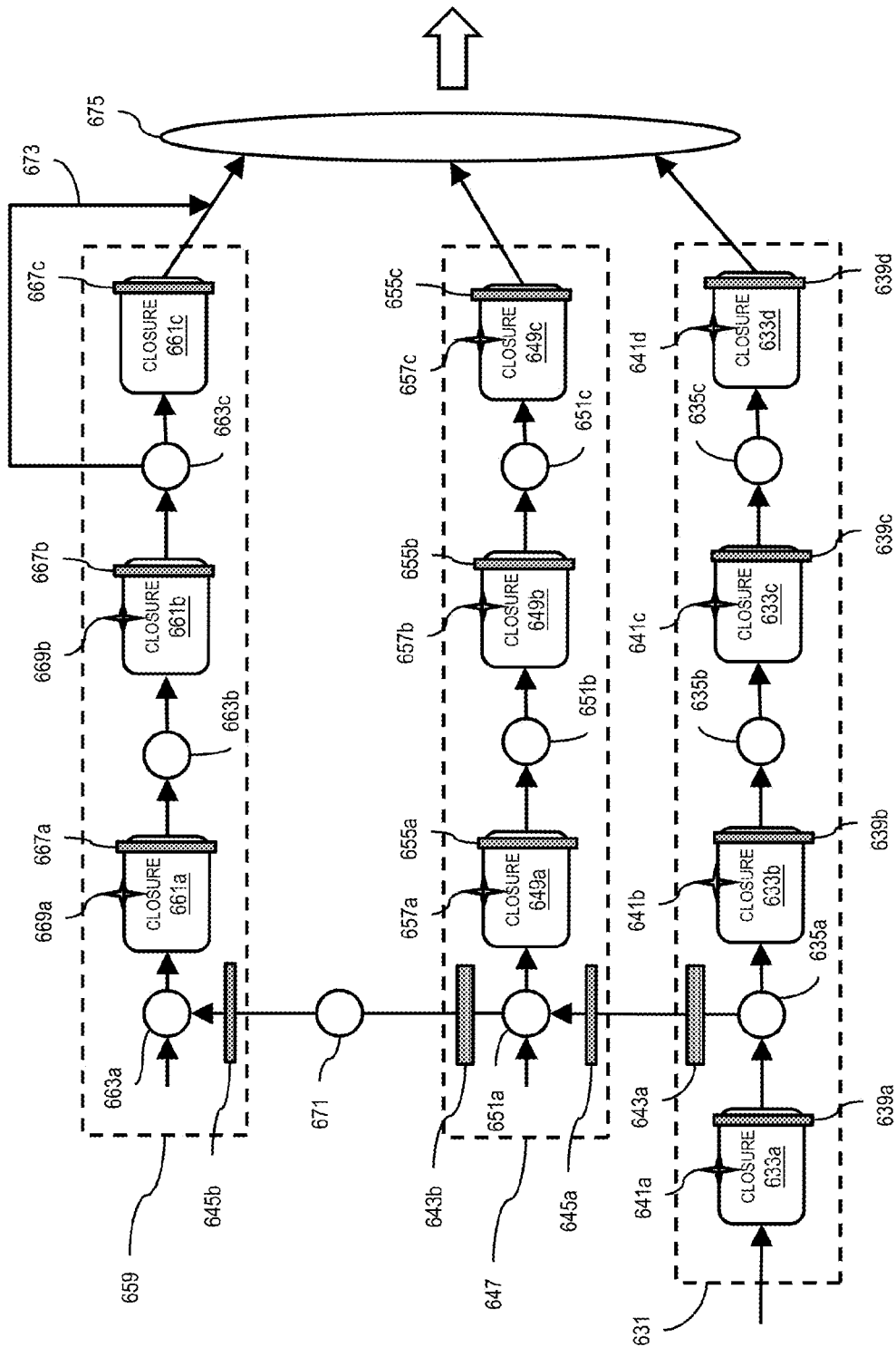

FIGS. 6A-6B are diagrams of distribution of IBE encrypted computations in multi-level computational architecture, according to one embodiment. FIG. 6A is a general representation of computation distribution. As seen in FIG. 6A, the computation distribution starts at a component 601 of an architectural level (not shown). Each component may decrypt and execute a set of closures that constitute a computation branch. For example, the branch 601 is composed of closures 603a-603d, wherein every two consecutive closures are connected via a connector and computational branches are communicating via connectors as well. For example, connectors 605a-605c connect closures 603a-603d. Connectors may also transfer information and data associated with a closure and its execution results to the next closure in the branch or to other branches. Additionally, connectors may function as links between related branches that constitute a distributed computation.

In one embodiment, connectors may contain information about parameters such as security, privacy, anonymization requirement and/or capabilities, functional flows, distribution maps, links between closures and architectural levels, encryption keys, etc. Arrows connecting closures to connectors and connectors to next closures show the functional flow adopted based on the parameters. As seen in FIG. 6A, the closures have been distributed from component 601 to component 607 via communication between connector 605a and connector 611a. The computation branch of component 607 includes closures 609a-609c communicating via connectors 611b and 611c, while branches 601 and 607 communicate via connectors 605a and 611a. Similarly, a third branch 613 has been formed of closures 615a-615c being decrypted and executed at component 613 and connected by connectors 617b and 617c, while the branch communicates with other branches via connector 617a.

In one embodiment, the initial branch 601 may be in a UE 107a-107i, the second branch 607 in a component of the infrastructure 117a-117n, and the third branch in another device, another component of the same infrastructure, a different infrastructure, in a cloud, or a combination thereof.

FIG. 6B shows a computation distribution together with various parameters affecting the distribution. As seen in FIG. 6B, the computation distribution starts at a component 631 of an architectural level (not shown). Each component may decrypt and execute a set of closures that constitute a computation branch. For example, the branch 631 is composed of closures 633a-633d, wherein every two consecutive closures are connected via a connector and computational branches are communicating via connectors as well. For example, connectors 635a-635c connect closures 633a-633d and connector 671 connects branches 647 and 659. Connectors may also transfer information and data associated with a closure and its decryption and execution results to the next closure in the branch or to other branches. Additionally, connectors may function as links between related branches that constitute a distributed computation.

In one embodiment, connectors may contain information about parameters such as capabilities including security, privacy, anonymization requirements and availability, a cost function, functional flow specifications, distribution maps, encryption keys, links between closures and architectural levels, etc. Arrows connecting closures to connectors and connectors to next closures show the functional flow adopted based on the parameters. For example, star signs 641a-641d, 657a-657c, and 669a-669b, represent security, privacy, anonymization rules and policies, or a combination thereof, imposed on the closures and the signs 645a-645b represent the security, privacy, anonymization rules and policies, or a combination thereof imposed on closures by the user of UEs 107a-107i, default by the manufacturer of UEs 107a-107i, by the infrastructures 117a-117k, by the clouds 111a-111n, or a combination thereof, and associated with each closure 633a-633d, 649a-649c, and 661a-661c respectively. Additionally, blocks 639a-639d, 655a-655c, and 667a-667c represent capability evaluation by the capability evaluator 207 for one or more closures, and blocks 643a-643b represent capability evaluation for one or more closure chains or functional flows. In the example of FIG. 6B, the evaluation 639a shows the capability requirements for closure 633a based on the rules 641a. In one embodiment, if capabilities 639a is in accordance with rules 641, the capability is validated and the closure 633a can be distributed (e.g. decryption allowed), however if capabilities 639a contradicts any rule of rules 641a, decryption of closure 633a will be denied.

In one embodiment, the block 643a represents a set of policies 639a-639d and block 645a represents combined security, privacy, anonymization rules of component 647 of the multi-level computation architecture. In this embodiment, if the policy module 209 detects a contradiction between the policies 643a and the rules 645a, the distribution of the closures (e.g. decryption of closures by component 647) will be denied.

In one embodiment, a closure or a group of closures may lack access to security, privacy, anonymization rules for the verification of their encryption. For example, in FIG. 6B the closure 661c is encrypted with no rules available. In this embodiment as seen by arrow 673, the distributed computation component that is executing branch 659 bypasses closure 661c without decryption and executing the computation 661c. The final results from closure decryption and execution of the three branches 631, 647, and 659 are aggregated by result aggregator 675 and forwarded to the requesting device.

Figure 7A:
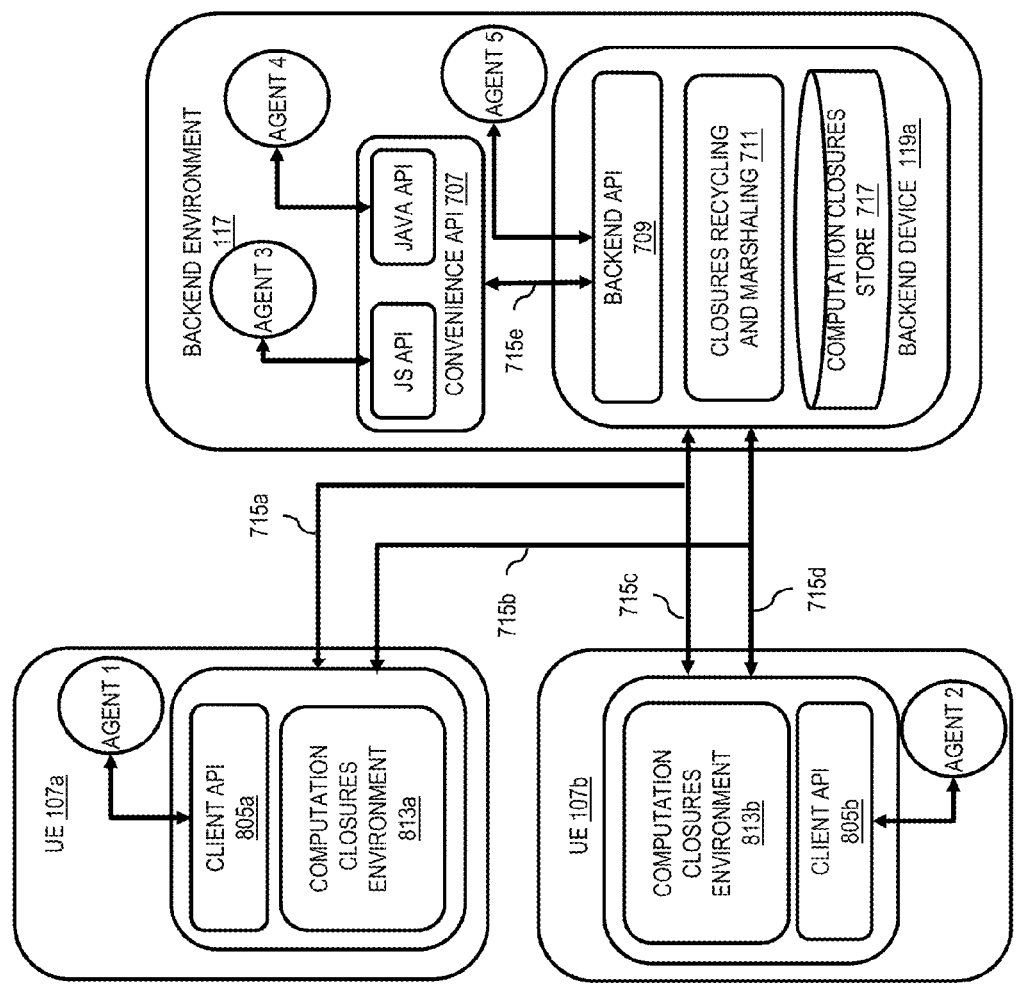
FIGS. 7A-7B are diagrams of computation distribution among devices, according to one embodiment.
Figure 7B:
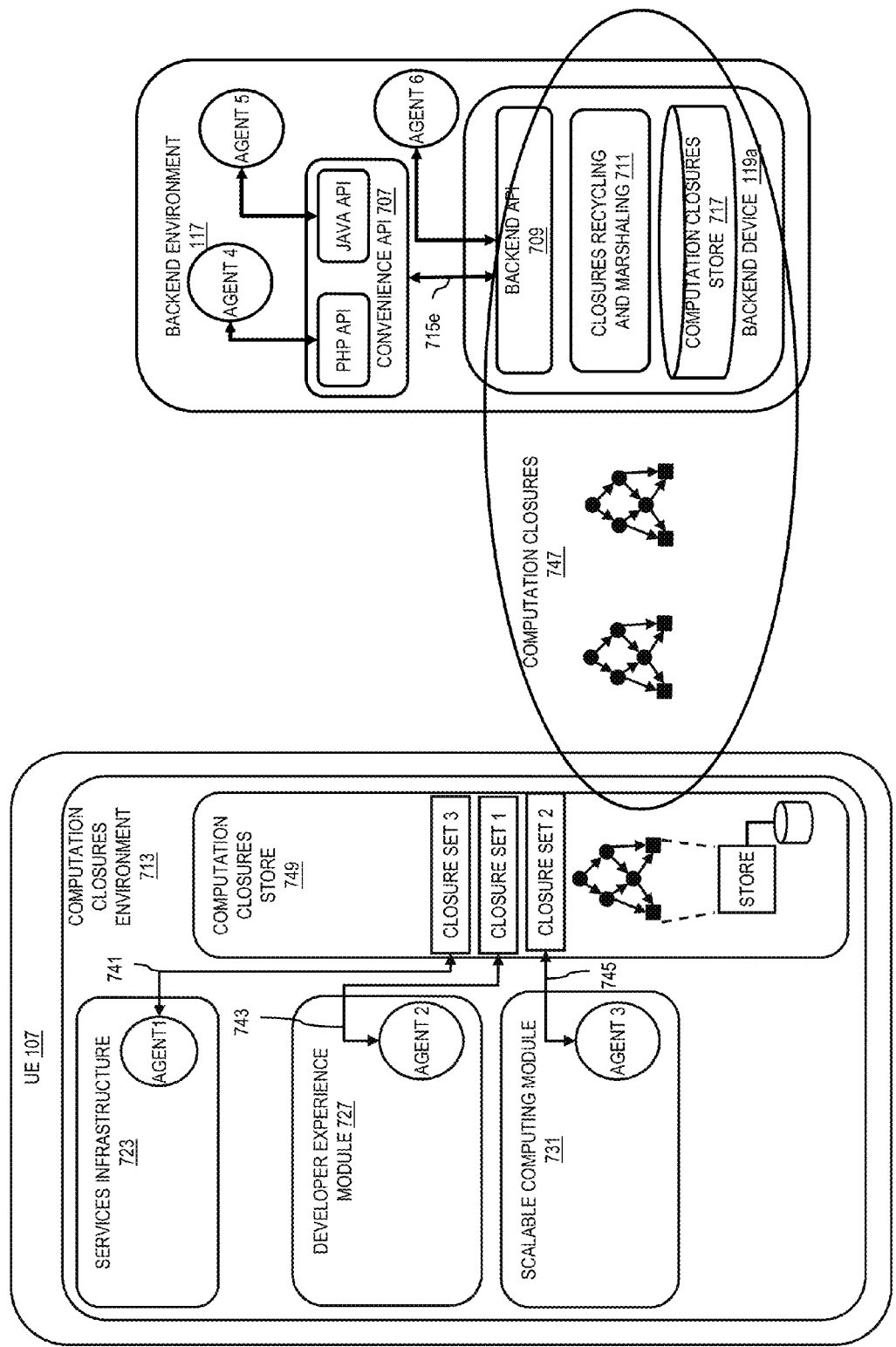

FIGS. 7A-7B are diagrams of computation distribution among devices, according to one embodiment. In one embodiment, in FIG. 7A, the backend environment 117 is a network infrastructure. The backend environment may also be a virtual run-time environment within a cloud 111 associated with the owner of UE 107a or on another UE 107b associated with the user. The backend environment 117 may include one or more components (backend devices) 119a and one or more Application Programming Interface (API) such as a convenience API 707 that may include APIs tailored to the software development environments used (e.g. JAVA, PHP, etc.). Furthermore, UEs 107a and 107b may include client APIs 705a and 705b. Each API enables interaction between devices and components within another device or an environment. For example, backend API 709 enables interaction between the backend device 119a and Agent5, and convenience API 707 enables interaction between the backend device 119a and agents Agent3 and Agent4, wherein each agent is a set of processes that handle computation closures within the backend environment 117. APIs 705a and 705b enable interaction between UE 107a and agent Agent1, and UE 107b and agent Agent2 respectively. As seen in the example of FIG. 7A, Agent3 works under PHP while Agent4 is a JAVA process. Each of the UEs 107a and 107b has a computation closure environment 713a and 713b which may be part of a cloud 111. Arrows 715a-715e represent distribution path of computation closures among the environments 713a, 713b and the computation closures store 717. The computation closures store 717 is a repository of computation closures that can be accessed and used by all the UEs and infrastructure components having connectivity to the backend environment 117.

In one embodiment, the backend device 119a may be equipped with a closure recycling and marshaling component 711 that monitors and manages any access to the computation closures store 717.

In one embodiment, the computation closures within environments 713a, 713b and the computation closures store 717 may be composed based on anonymous function objects and automatically created by a compiling system using methods for generating anonymous function objects such as lambda expressions.

FIG. 7B is an expanded view of a computation closure environment 713 as introduced in FIG. 7A. The computation closure environment 713 may be composed of one or more computation closure generating components. In one embodiment the computation closure environment 713 has a services infrastructure 723 that provides various services for the user of the UE 107. The services may include any application that can be performed on the UE 107 such as, games, music, text messaging, voice calls, etc. In one embodiment, the services infrastructure 723 provides support for closure encryption under the supervision of an identity based encryption platform 103 as discussed in FIG. 1, FIG. 2, FIG. 3 and FIG. 4. The agent Agent1 retrieves the computation closures required by the services infrastructure 723 from the computation closures store 749 and stores the newly generated computation closures by the services infrastructure 723 into the computation closures store 749 for distribution purposes per arrow 741.

In another embodiment, the computation closure environment 713 has a developer experience module 727 that provides various tools for a developer for manipulating services offered by the UE 107. The tools may include standardized and/or abstract data types and services allowing the developers to chain processes together across development platforms. In one embodiment, the developer experience module 727 provides cross platform support for abstract data types and services under the supervision of an identity based encryption platform 103 as discussed in FIG. 1. The agent Agent2 retrieves the computation closures required by the developer experience module 727 from the computation closures store 749 and stores the newly generated computation closures by the developer experience module 727 into the computation closures store 749 for distribution purposes per arrow 743.

In yet another embodiment, the computation closure environment 713 has a scalable computing module 731 that provides an abstract wrapper (i.e. monadic wrapper) for the migrating closures 501. This abstraction provides computation compatibility between the closures 501 and the UE 107. The abstract wrapper may provide scheduling, memory management, system calls and other services for various processes associated with the closures 501. These services are provided under the supervision of the identity based encryption platform 103 as discussed in FIG. 1. The agent Agent3 retrieves the computation closures required by the scalable computing module 731 from the computation closures store 749 and stores the newly generated computation closures by the scalable computing module 731 into the computation closures store 749 for distribution purposes per arrow 745. In one embodiment, the backend environment 117 may access the computation closures store 749 and exchange/migrate one or more computer closures 747 between the computation closures store 749 and the backend computation closures store 717.

Figure 8:
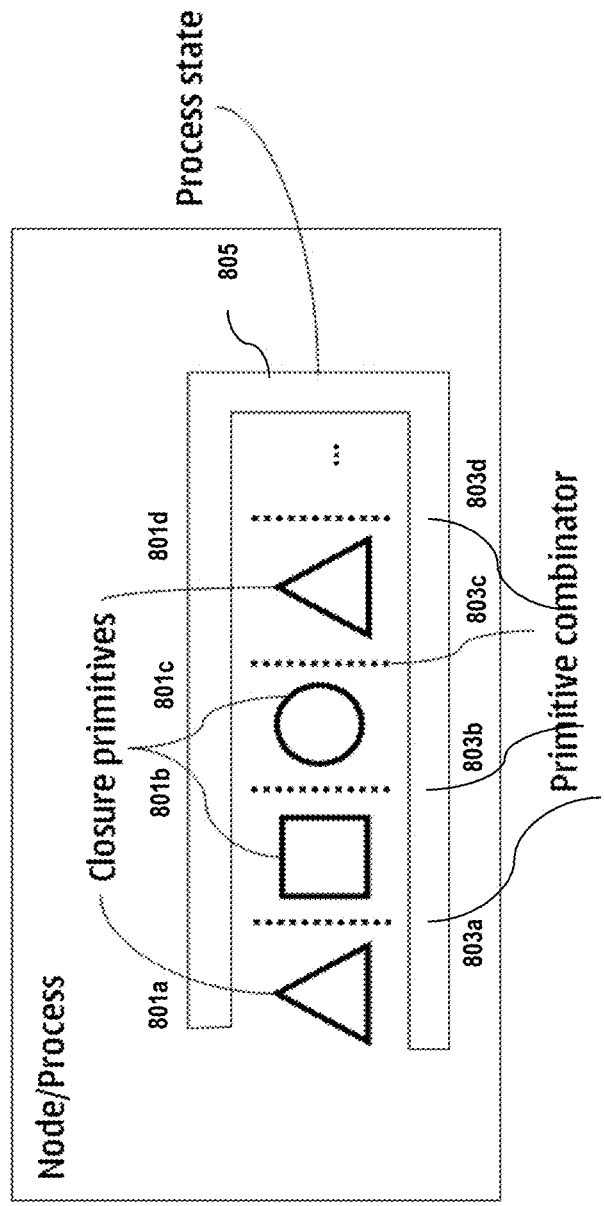
FIG. 8 is a diagram showing a process as a combination of primitive computation closures, according to one embodiment.

FIG. 8 is a diagram showing a process as a combination of primitive computation closures, according to one embodiment. Process 800 consists of closure primitives 801a-801d. The closure primitives 801a-801d, which are similar to geometric icon closures of FIG. 5, are combined with each other into process 800 by combinators 803a-803d. The object 805 represents the execution requirements including process states under which the execution of closures 801a-801d combined by combinators 803a-803d will result in the process 800.

In one embodiment, the identity based encryption platform 103 causes the segmentation of the computation closure 800 into, for example, a first part 801a and second parts 801b, 801c, and 801d. The identity based encryption platform 103 may also causes encryption of the second parts 810b, 801c, and 801d using the first part 801a as a public key of an identity-based encryption.

In one embodiment, distribution of process 800 includes distribution of closures 801a-801d, combinators 803a-803d and the process states 805 as independent elements into, for instance, an infrastructure environment 117. The independent closures 801a-801d from infrastructure environment 117 may be distributed into different components 119a-119m based on the capabilities of the components where they may be decrypted and executed.

Figure 9:
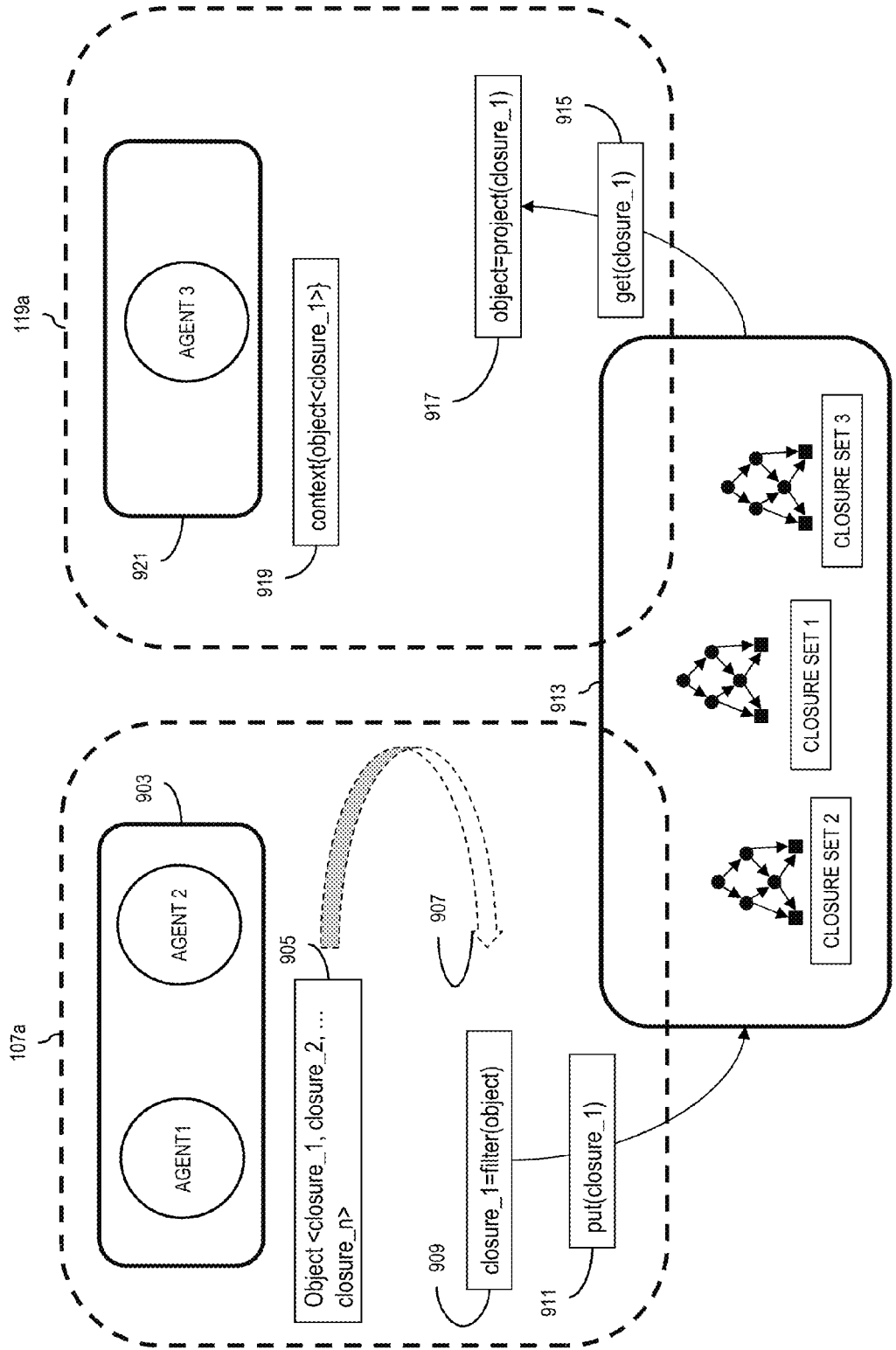
FIG. 9 is a diagram of process distribution from a device to another device, according to one embodiment.

FIG. 9 is a diagram of process distribution from a device to another device, according to one embodiment. In one embodiment, the device 107a is a UE associated with the user. The UE 107a may include a user context 903 which is being migrated among devices. Agent1 and agent2 are processors that calculate and handle computation closures within the user context 903. The number of agents may be different in different devices based on their design, functionality, processing power, etc. Block 905 represents an Object as a set of computation closures, closure_1, closure_2, . . . , and closure n, where each closure is a component of a larger process, for example, related to a service provided to the user by the user equipment 107a. Each closure is a standalone process that can be executed independently from the other closures. In the example of FIG. 9, the filtering process 907 extracts closure_1 from the closure set Object via filtering the set (shown in block 909). The extracted closure_1 is added to a computation closure store 913 using the exemplary Put command 911.

It is assumed, in this example, that component 119a of an infrastructure level (not shown) is selected by the identity based encryption platform 103 as a destination for closure distribution from UE 107a, based on the capabilities such as, for example, availability of sufficient security, privacy, computational resources, bandwidth, energy, or a combination thereof. The extracted computation closure, closure_1 is migrated to component 119a following the assignment of a distribution path (similar to path 513 in FIG. 5, and is executed on component 119a.

In one embodiment, the component 119a receives the computation closure closure_1 and extracts it from the computation closure store 913 using the Get command 915. The extracted closure_1 is projected into a closure with the user device context and the object 917 is produced. The block 919 represents the reconstruction of the closure into the initial context by a component in charge of the execution. The aggregated context may then be executed in the run-time environment 921 of component 119a by Agent3.

In another embodiment, the UE 107a and component 119a may exchange places and the distribution is performed from the component 119a to UE 107a or both devices may be UEs. In this embodiment the decomposition and aggregation processes are similar to the above example.

Figure 10:
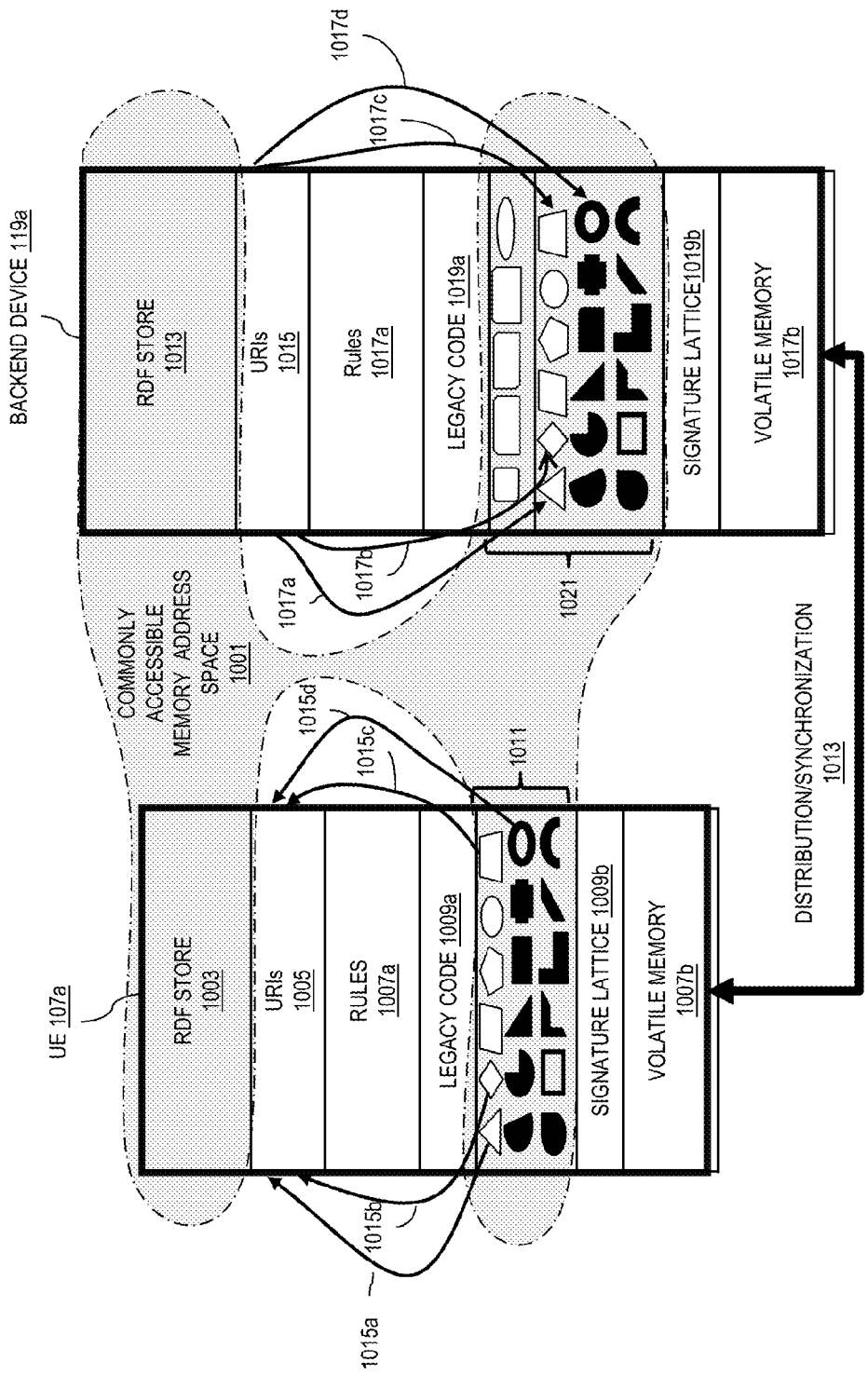
FIG. 10 is a diagram of computation closure allocation/mapping, according to one embodiment.

FIG. 10 is a diagram of computation closure allocation/mapping, according to one embodiment. The diagram of FIG. 10 shows a commonly accessible memory address space 1001 formed between a UE 107a as a client and the backend device 119a as a component of a computation infrastructure 117.

In one embodiment, the UE 107a may include RDF store 1003, which holds computation closures for processes associated with the UE 107a. Similarly the backend device 119a may includes a RDF store 1013, which holds computation closures associated with processes related to device 119a, UEs 107a-107i, or any other devices having connectivity to device 119a or cloud 111.

In other embodiments, the Uniform Resource Identifiers (URIs) 1005 in UE 107a and 1015 in backend device 119a may be used to identify names or resources accessible to their respective devices via the communication network 105. Additionally, UE 107a and backend device 119a may have rule sets 1007a and 1017a that include security, privacy, anonymization rules imposed on device similar to rules 669a-669b of FIG. 6B. It is noted that the rule base 1007a of UE 107a may be a subset of the rule base 1017a of the backend device 119a, wherein the rules 1017a is a subset of a superset of rules managed by a cloud 111. Furthermore, the legacy codes associated with each device may be stored in legacy code memory areas 1009a and 1009b on UE 107a and 1019a and 1019b on backend device 119a.

In one embodiment, UE 107a may be provided with a non-volatile memory space 1011 as a closure store. The closure store 1011 may include a set of closure primitives shown as geometric objects, similar to primitives of sets 501 or 503 of FIG. 5. Similarly, the backend device 119a may be provided with a non-volatile memory space 1021 as a closure store. The closure store 1021 may also include a set of closure primitives shown as geometric objects. In one embodiment, the closure store 1011 is a subset of closure store 1021 determined, at least in part, based on one or more criteria such as time of access, frequency of access, a priority classification, security, privacy, anonymization settings, or a combination thereof, etc. The geometric shapes of closure stores 1011 and 1021 have been each divided into two groups of solidly filled geometric shapes (representing signed closures) and unfilled geometric shapes (representing unsigned closures). Since non-volatile memories are costly and require extensive resources (e.g. power consumption) compared with volatile memories (such as 1007a, 1007b, 1017a, and 1017b), the capacity of non-volatile memory on a UE 107a-107i is limited. However, a backend device 119a, serving high numbers of users, may be equipped with larger volumes of non-volatile memory spaces. Because of the limited capacity of non-volatile memory spaces on UEs 107a-107i, and also because differing levels of security, privacy, anonymization setup on various devices, only a subset of the closure store 1021 is stored locally at the closure store 1011 for local use by the UE 107a. In order to minimize the number of times a UE 107 needs to retrieve one or more primitives from closure store 1021 of device 109a, the subset 1011 is determined based on one or more criteria. In one embodiment, the closure store 1011 may be determined as a set of the most frequently accessed closure primitives of closure store 1021 by UE 107a. In another embodiment, the closure store 1011 may be determined as a set of the most recently accessed closure primitives of closure store 1021 by UE 107a. In other embodiments, various combined conditions and criteria may be used for determining subset 1011 from set 1021 as the content of closure store for UE 107a. Furthermore, the closure stores 1011 and 1021 may be periodically synchronized. The synchronization of closure stores ensures that any changes (addition, deletion, modification, etc.) in closure primitives and in root elements of the signature lattice of closure store 1021 are reflected in the closure store 1011.

In one embodiment, for execution of a closure set 501 (a subset of closure store 1011) associated with a process on UE 107a, the set 501 can be migrated under the supervision of the identity based encryption platform 103 and after verification of the security, privacy, anonymization of closures, or a combination thereof, and capabilities of the destination component, to the backend device 119a which is a component of the infrastructure 117 (the distribution path shown as arrow 1023). The identity based encryption platform 103 may then inform the processing components of the UE 107a, the backend device 119a or a combination thereof (the processing components are not shown), that the security, privacy, anonymization, or a combination thereof, of closure primitives has been approved and the closures are ready for decryption and execution. Alternatively, the identity based encryption platform 103 may determine that the closures are not approved from point of view of the security, privacy, anonymization, or a combination thereof, and terminate their distribution, decryption and execution.

In one embodiment, any changes on the closure store 1021 of the backend device 119*a* (e.g., addition, deletion, modification, etc.) may first enter the URIs 1015 via the communication network 105. The changes may then be applied from URIs 1015 on closure store 1021 shown by arrows 1027*a*-1027*d*. Similarly, the closure store 1011 is updated based on the content of the closure store 1021 and the updates are shared with other authorized components within UE 107*a* (e.g. with URIs 1005 as shown by arrows 1025*a*-1025*d*).

In one embodiment, the commonly accessible memory address space 1001 is formed from the RDF stores 1003 and 1013 and the closure stores 1011 and 1021. The commonly accessible memory address space 1001 can be accessed as a continuous memory space by each of the devices 107*a* and 119*a*.

The processes described herein for providing identity based encryption in distributed computations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
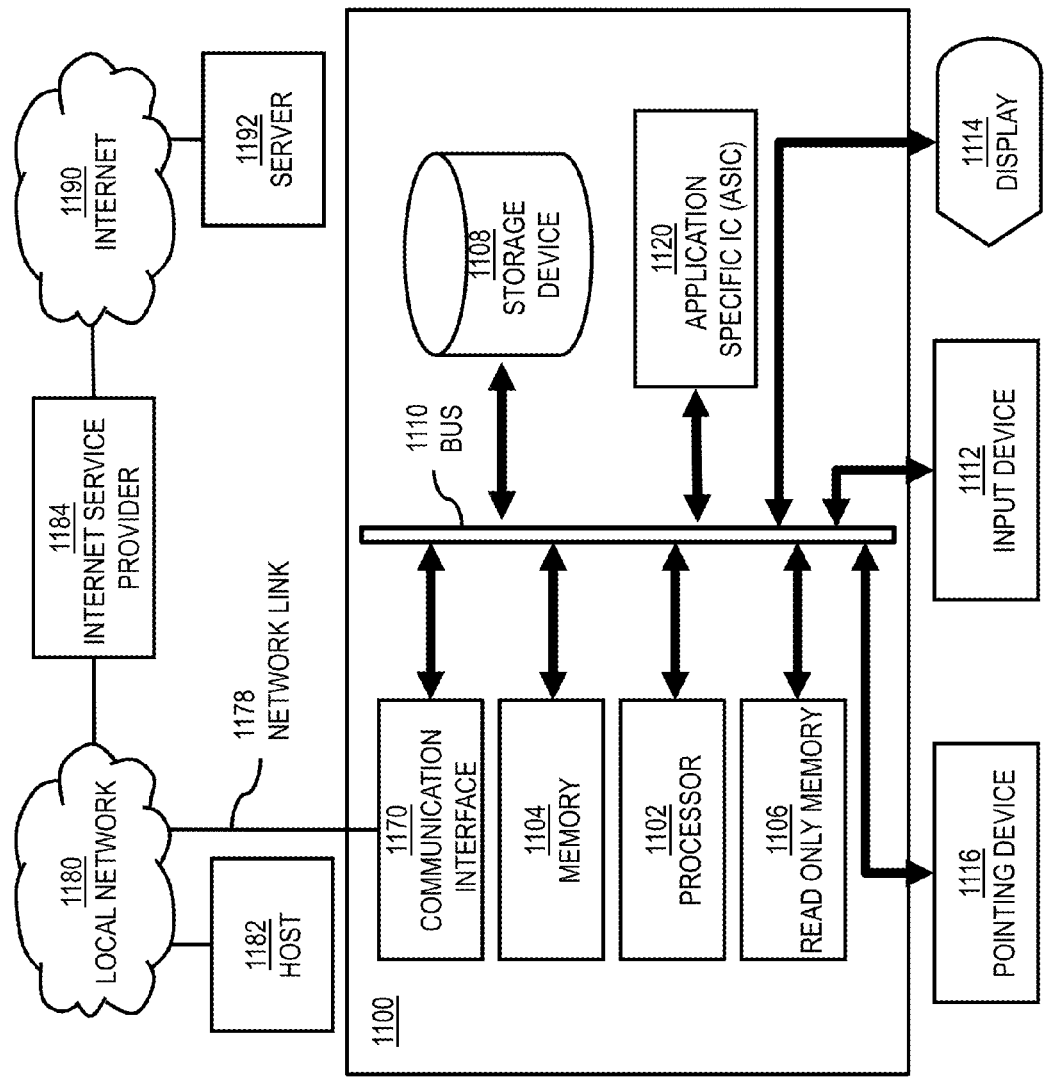
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to provide identity based encryption in distributed computations as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of providing identity based encryption in distributed computations.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to providing identity based encryption in distributed computations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for providing identity based encryption in distributed computations. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing identity based encryption in distributed computations, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for providing identity based encryption in distributed computations provided to the UEs 107a-107i in sets 101a-101n.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to provide identity based encryption in distributed computations as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of providing identity based encryption in distributed computations.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide identity based encryption in distributed computations. The memory 1205 also stores the data associated with or generated by the execution of the inventive steps.

Figure 13:
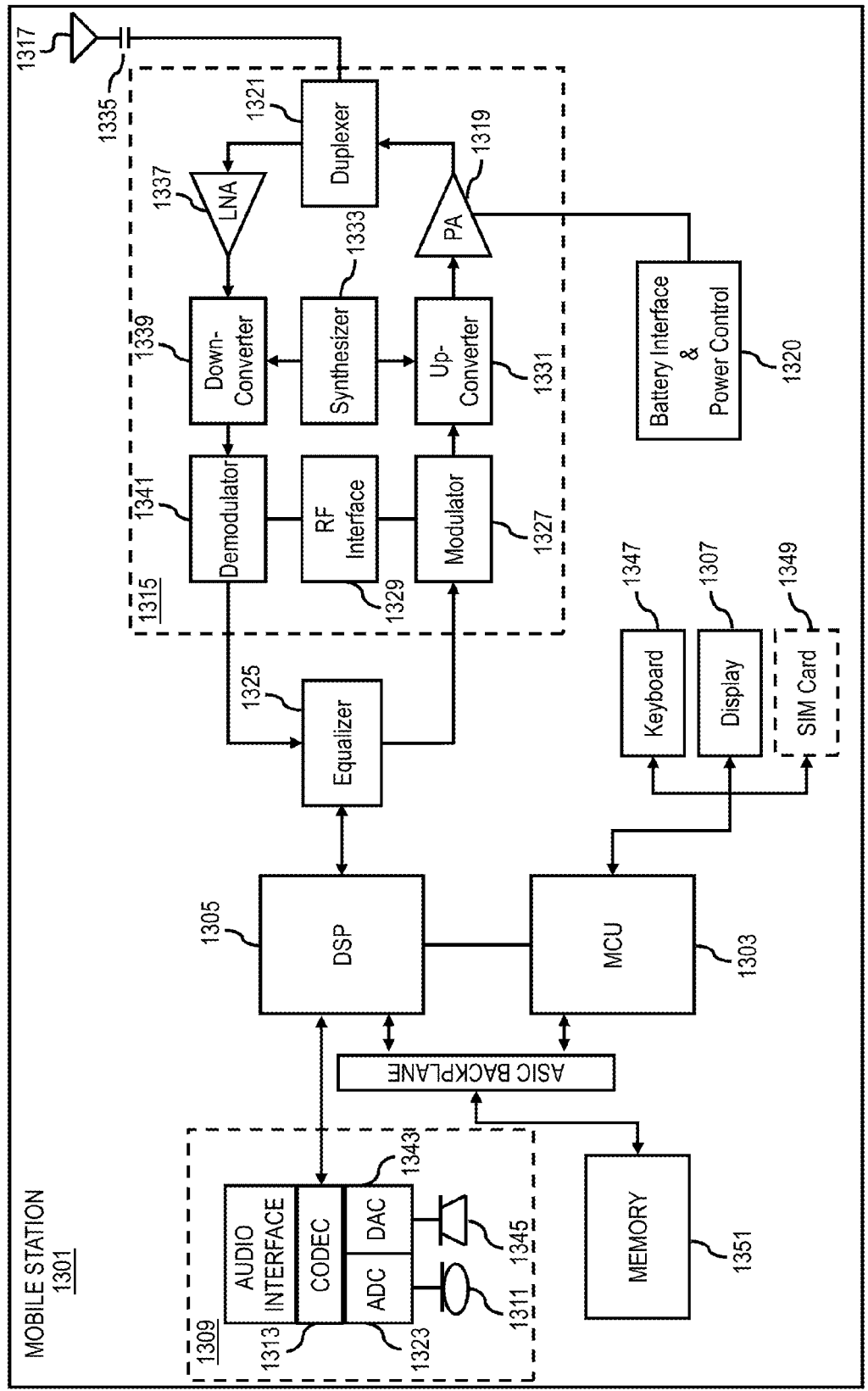
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of providing identity based encryption in distributed computations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing identity based encryption in distributed computations. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to provide identity based encryption in distributed computations. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method, comprising:
  segmenting a computation closure into at least a first part and one or more second parts, wherein the computation closure comprises a computation procedure and inter-process relations and inter-process communications;
  encrypting the one or more second parts using the first part as a public key based on an identity-based encryption; and
  determining one or more anonymization policies associated with the identity-based encryption, the computation closure, the first part, the one or more second parts, or a combination thereof,
  wherein the encryption is based, at least in part, on the one or more anonymization policies.

2. The method of claim 1 further comprising:

determining one or more criteria for executing the computation closure, the one or more second parts, or a combination thereof; (b) one or more processes for determining the one or more criteria; (c) or a combination thereof; and including the one or more criteria, the one or more processes, or a combination in the first part, wherein the executed state is a reflection of results of executing computations in the computation closure on data in the computation closure.

3. The method of claim 2 further comprising:

publishing the first part, the encrypted one or more second parts, or a combination for access by one or more subscribing devices.

4. The method of claim 3 further comprising:

processing capability information associated with the one or more subscribing devices to determine whether the one or more subscribing devices decrypt the one or more encrypted second parts for execution.

5. The method of claim 4, wherein the capability information is based, at least in part, on energy consumption information, security enforcement information, one or more privacy policies, computational resource information, bandwidth availability information, or a combination thereof.

6. The method of claim 2, wherein the one or more subscribing devices include, at least in part, one or more components of one or more levels of a computational architecture.

7. The method of claim 6 further comprising:

determining the one or more anonymization policies based, at least in part, on a concatenation of the one or more level-specific anonymization policies associated with the one or more levels of the computational architecture.

8. The method of claim 1, wherein the segmentation, the encryption, or a combination thereof of the computation closure is based, at least in part, on one or more cost functions, one or more functional flow maps, or a combination thereof associated with the computation closure.

9. The method of claim 1, wherein the encryption is further based, at least in part, on one or more private keys.

10. An apparatus comprising:

at least one processing device; and at least one memory including computer program code for one or more programs, the at least one memory and the computer program code configured to, with the at least one, processing device, cause the apparatus to perform at least the following, cause a segmentation of a computation closure into at least a first part and one or more second parts, wherein the computation closure comprises a computation procedure and inter-process relations and inter-process communications;

cause an encryption of the one or more second parts using the first part as a public key based on an identity-based encryption; and determine one or more anonymization policies associated with the identity-based encryption, the computation closure, the first part, the one or more second parts, or a combination thereof, wherein the encryption is based, at least in part, on the one or more anonymization policies.

11. The apparatus of claim 10, wherein the apparatus is further caused to:

determine (a) one or more criteria for executing the computation closure, the one or more second parts, or a combination thereof; (b) one or more processes for determining the one or more criteria; (c) or a combination thereof; and cause an inclusion of the one or more criteria, the one or more processes, or a combination in the first part, wherein the executed state is a reflection of results of executing computations in the computation closure on data in the computation closure.

12. The apparatus of claim 11, wherein the apparatus is further caused to: cause a publication of the first part, the encrypted one or more second parts, or a combination for access by one or more subscribing devices.

13. The apparatus of claim 12, wherein the apparatus is further caused to:

process or facilitate a processing of capability information associated with the one or more subscribing devices to determine whether the one or more subscribing devices can decrypt the one or more encrypted second parts for execution.

14. The apparatus of claim 13, wherein the capability information is based, at least in part, on energy consumption information, security enforcement information, one or more privacy policies, computational resource information, bandwidth availability information, or a combination thereof.

15. The apparatus of claim 12, wherein the one or more subscribing devices include one or more components of one or more levels of a computational architecture.

16. The apparatus of claim 15, wherein the apparatus is further caused to:

determine the one or more anonymization policies based, at least in part, on a concatenation of the one or more level-specific anonymization policies associated with the one or more levels of the computational architecture.

17. The apparatus of claim 10, wherein the segmentation, the encryption, or a combination thereof of the computation closure is based, at least in part, on one or more cost functions, one or more functional flow maps, or a combination thereof associated with the computation closure.

18. The apparatus of claim 10, wherein the encryption is further based, at least in part, on one or more private keys.

* * * * *

UNITED STATES PATENT AND TRADEMARK OFFICE
CERTIFICATE OF CORRECTION

PATENT NO. : 9,166,953 B2
APPLICATION NO. : 13/285254
DATED : October 20, 2015
INVENTOR(S) : Luukkala et al.

It is certified that error appears in the above-identified patent and that said Letters Patent is hereby corrected as shown below:

In the claims:

Column 29,
Lines 4 and 5, delete the letters "(b)" and "(c)" from the clause.

Signed and Sealed this
Tenth Day of May, 2016

Michelle K. Lee
*Director of the United States Patent and Trademark Office*